(12) United States Patent
Lee et al.

(10) Patent No.: US 10,890,725 B2
(45) Date of Patent: Jan. 12, 2021

(54) OPTICAL CONNECTOR AND CONTROL METHOD OF DISPLAY APPARATUS

(71) Applicant: Samsung Electronics Co., Ltd., Suwon-si (KR)

(72) Inventors: Won-jae Lee, Seoul (KR); Jong-jin Park, Suwon-si (KR); Min-sup Kim, Suwon-si (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/991,095

(22) Filed: May 29, 2018

(65) Prior Publication Data

US 2019/0018205 A1 Jan. 17, 2019

(30) Foreign Application Priority Data

Jul. 12, 2017 (KR) .................... 10-2017-0088375

(51) Int. Cl.
*G02B 6/38* (2006.01)

(52) U.S. Cl.
CPC .......... *G02B 6/3897* (2013.01); *G02B 6/389* (2013.01); *G02B 6/3869* (2013.01); *G02B 6/3882* (2013.01)

(58) Field of Classification Search
CPC .. G02B 6/3897; G02B 6/3869; G02B 6/3882; G02B 6/389
See application file for complete search history.

(56) References Cited

U.S. PATENT DOCUMENTS

| 4,549,179 | A  | * | 10/1985 | Stendardo | ............... | H03G 1/02 |
| | | | | | | 340/12.22 |
| 6,238,249 | B1 | * | 5/2001 | Kuwamura | .......... | G02B 6/4292 |
| | | | | | | 439/668 |
| 6,437,894 | B1 | | 8/2002 | Gilbert et al. | | |
| 7,275,875 | B1 | * | 10/2007 | Banchieri | ............ | G02B 6/4292 |
| | | | | | | 385/117 |
| 7,374,101 | B2 | * | 5/2008 | Kaneko | .............. | G06K 7/10178 |
| | | | | | | 235/492 |

(Continued)

FOREIGN PATENT DOCUMENTS

| JP | 5-347588 | 12/1993 |
| JP | 8-110437 | 4/1996 |

(Continued)

OTHER PUBLICATIONS

Samsung-HU9000, Display and One Connect Installation, [HU9000-QSG]BN68-05947A-03ENG.indb, "Samsung" (Year: 2014).*

(Continued)

*Primary Examiner* — Peter Radkowski
(74) *Attorney, Agent, or Firm* — Staas & Halsey LLP

(57) ABSTRACT

A control method of an optical connector and a display apparatus is provided. More particularly, a control method of an optical connector and a display apparatus for changing output of audio according to combination of an optical cable and the optical connector may be provided. Some of the example embodiments provide a control method of an optical connector and a display apparatus which may output audio through one of an internal speaker and an external apparatus connected via an optical cable according to combination of an optical cable and an optical connector.

9 Claims, 24 Drawing Sheets

(56) References Cited

U.S. PATENT DOCUMENTS

| | | | | |
|---|---|---|---|---|
| 7,435,009 | B1* | 10/2008 | Riha | H04Q 1/136 385/53 |
| 7,769,187 | B1* | 8/2010 | Farrar | H04R 1/1041 381/384 |
| 7,980,767 | B2* | 7/2011 | Riha | H04Q 1/136 385/53 |
| 8,573,861 | B2* | 11/2013 | Terlizzi | G02B 6/3817 385/88 |
| 8,577,195 | B2* | 11/2013 | Terlizzi | G02B 6/3817 385/101 |
| 8,587,960 | B2 | 11/2013 | Hwang et al. | |
| 8,651,750 | B2* | 2/2014 | Terlizzi | G02B 6/3817 385/75 |
| 8,682,003 | B2* | 3/2014 | Terlizzi | G02B 6/3817 381/74 |
| 8,718,294 | B2* | 5/2014 | Terlizzi | G02B 6/3817 381/122 |
| 8,989,884 | B2* | 3/2015 | Guetta | G11B 20/10527 700/94 |
| 9,300,083 | B2* | 3/2016 | Bosscher | H04B 5/0081 |
| 9,392,715 | B2 | 7/2016 | Hwang et al. | |
| 9,502,041 | B2 | 11/2016 | Kim | |
| 9,516,440 | B2* | 12/2016 | Jarvis | H04R 27/00 |
| 9,606,298 | B2 | 3/2017 | Sato et al. | |
| 9,838,085 | B2* | 12/2017 | Bosscher | H04B 5/0037 |
| 9,844,153 | B2 | 12/2017 | Hwang et al. | |
| 2006/0236359 | A1* | 10/2006 | Lee | H04N 5/04 725/133 |
| 2011/0130853 | A1* | 6/2011 | Han | H03G 3/3005 700/94 |
| 2011/0164394 | A1* | 7/2011 | Hwang | H05K 5/02 361/818 |
| 2012/0072896 | A1* | 3/2012 | Watanabe | H04N 7/163 717/170 |
| 2012/0079473 | A1* | 3/2012 | Watanabe | G06F 8/65 717/170 |
| 2012/0127373 | A1* | 5/2012 | Ha | H04N 5/44 348/730 |
| 2012/0179279 | A1* | 7/2012 | Guetta | G11B 20/10527 700/94 |
| 2014/0055960 | A1 | 2/2014 | Hwang et al. | |
| 2014/0093085 | A1* | 4/2014 | Jarvis | H04R 27/00 381/17 |
| 2014/0342660 | A1* | 11/2014 | Fullam | H04N 7/181 455/3.06 |
| 2014/0347565 | A1* | 11/2014 | Fullam | H04N 5/607 348/738 |
| 2015/0149184 | A1* | 5/2015 | Kim | G10L 19/00 704/500 |
| 2016/0211889 | A1* | 7/2016 | Bosscher | H01R 13/6683 |
| 2016/0295713 | A1 | 10/2016 | Hwang et al. | |
| 2017/0041726 | A1* | 2/2017 | Jarvis | H04R 27/00 |

FOREIGN PATENT DOCUMENTS

| | | |
|---|---|---|
| JP | 9-281359 | 10/1997 |
| JP | 3121165 * | 4/2006 |
| KR | 10-2007-0082754 | 8/2007 |
| KR | 10-2010-0025709 | 3/2010 |
| KR | 10-2011-0080925 | 7/2011 |
| KR | 10-2015-0059483 | 6/2015 |

OTHER PUBLICATIONS

International Search Report dated Sep. 21, 2018 in corresponding International Patent Application No. PCT/KR2018/006086.
Written Opinion of the International Searching Authority dated Sep. 21, 2018 in corresponding International Patent Application No. PCT/KR2018/006086.

* cited by examiner

OPTICAL CONNECTOR AND CONTROL METHOD OF DISPLAY APPARATUS

CROSS-REFERENCE TO RELATED APPLICATION

This application claims priority from Korean Patent Application No. 10-2017-0088375, filed in the Korean Intellectual Property Office on Jul. 12, 2017, the disclosure of which is incorporated herein by reference in its entirety.

BACKGROUND

1. Field

Aspects of the example embodiments relate to an optical connector and a control method of a display apparatus, more particularly, to an optical connector of a display capable of detecting whether an optical cable plug is attached and a control method of a display apparatus.

2. Description of Related Art

Generally, a panel key of a display apparatus, a remote controller, a user voice or a user motion are used as an interface between a display apparatus capable of outputting content including a broadcast and a user.

With the development of technology, the functions of a display apparatus have become complex (e.g., performing various applications, games, etc.) and diverse such that a display apparatus may execute content such as a video downloaded from an external source, and perform Internet browsing. Also, various external apparatuses may be connected through an input/output unit.

Accordingly, the need for a display apparatus capable of notifying a user of whether an external apparatus is connected in response to connection between various external apparatuses and a display apparatus has been increased.

SUMMARY

According to an example embodiment, a display apparatus is provided, the display apparatus including a display, a speaker, an optical connector configured to be connected with an external apparatus via an optical cable, a processor configured to control the display, the speaker and the optical connector, wherein the processor controls audio output from the speaker to be output from the external apparatus that is connected with the optical connector via the optical cable based on combination of the optical connector and the optical cable.

The processor may identify whether the optical connector is combined with or is separated from the optical cable depending on whether an electric signal according to contact between the optical connector and the optical cable is received.

The processor may control an audio setting conversion screen corresponding to combination of the optical cable and the optical cable to be displayed on the display.

According to an example embodiment, a display apparatus is provided, the display apparatus including a display configured to display content, an internal speaker, an optical connector configured to be connected with an external apparatus outputting audio corresponding to the content via an optical cable, a processor configured to control the display, the internal speaker and the optical connector, wherein the processor controls audio output from the exter-nal apparatus to be output from the internal speaker according to separation of the optical connector and the optical cable.

According to an example embodiment, a control method of a display apparatus is provided, the method including displaying content on a display, outputting audio corresponding to the content via an internal speaker, detecting whether an optical cable connected with an external apparatus is combined with an optical cable, and transmitting audio output from the internal speaker to the external apparatus via the optical cable to be output from the external apparatus in response to combination of the optical cable and the optical connector.

A control method of an optical connector and the display apparatus for detecting the combination (insertion or connection) of the optical connector and an optical cable plug may be provided.

A control method of an optical connector and the display apparatus for detecting the separation (or release) of the optical connector and an optical cable plug may be provided.

A control method of an optical connector and the display apparatus for identifying whether an optical connector and an optical cable are combined or separated depending on whether an electric signal according to contact between the optical connector and the optical cable is received may be provided.

A control method of an optical connector and the display apparatus for detecting whether the optical connector is attached to or is detached from an optical cable plug may be provided.

A control method of an optical connector and the display apparatus for changing output of audio according to combination of the optical connector and an optical cable plug may be provided.

A control method of an optical connector and the display apparatus for changing output of audio according to separation of the optical connector and an optical cable plug may be provided.

The example embodiments are not limited to the above examples, but according to one or more example embodiments, a control method of an optical connector and the display apparatus for detecting whether the optical connector is attached to or is detached from an optical cable plug may also be provided.

DETAILED DESCRIPTION

Figure 1A:
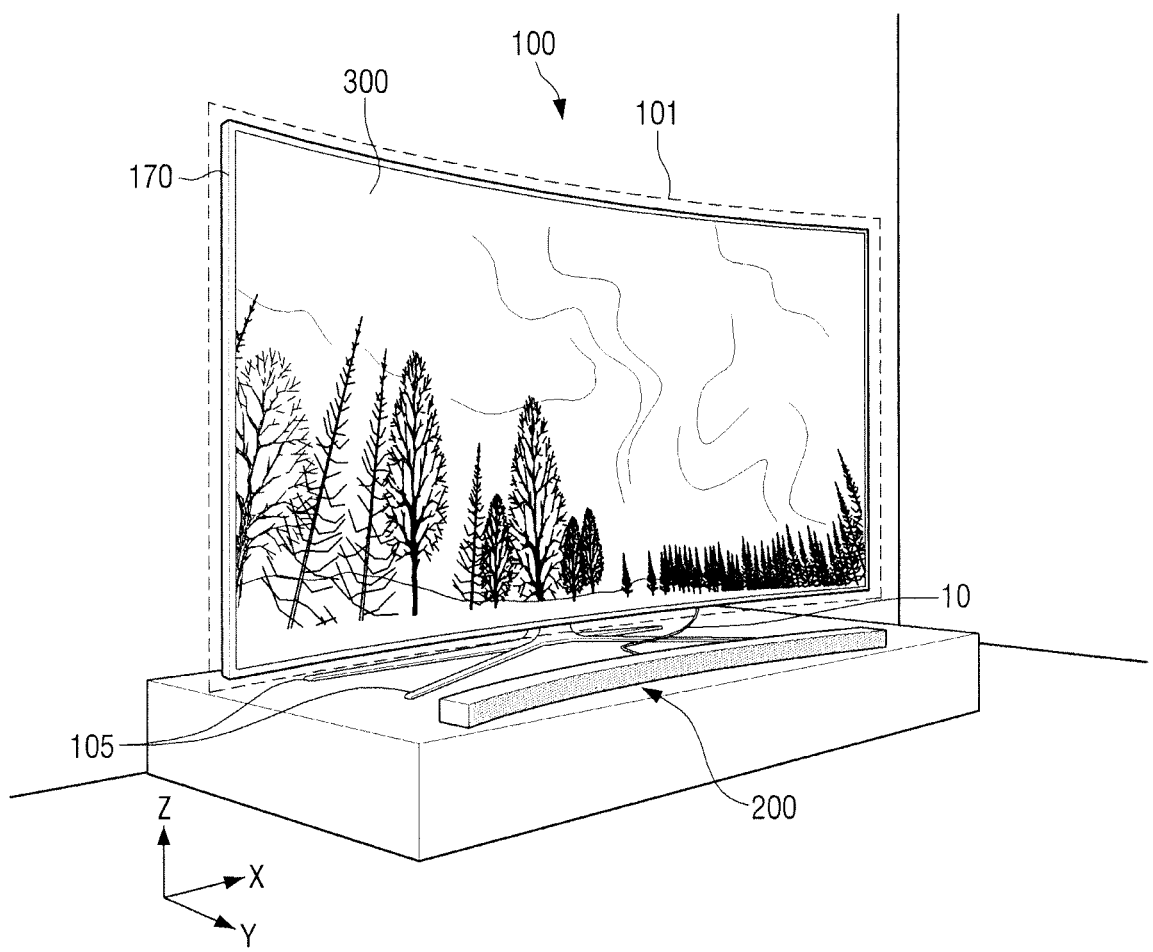
FIG. 1A is a diagram illustrating a display apparatus and an external apparatus connected via an optical cable according to an example embodiment.

Various example embodiments will be described with reference to accompanying drawings. Also, the method for manufacturing and using an electronic apparatus will be described with reference to accompanying drawings in accordance with an example embodiment. A same reference numeral or a same sign in each diagram may indicate a component or an element which substantively performs a same function.

The terms including ordinal number such as "first," "second," and so on may be used in the description and the claims to distinguish the elements from one another. These terms are used only for the purpose of differentiating one component from another, without limitation thereto. For example, the first element may be named the second element without departing from the scope of right of the various example embodiments of the present disclosure, and similarly, the second element may be named the first element. The term "and/or" includes a combination of a plurality of described relevant items or any item of a plurality of described relevant items.

In the example embodiments, the term 'combination by a user' may indicate that an optical cable plug is combined (connected or attached) with an optical connector of a display apparatus by a user. The term 'separation by a user' may indicate that an optical cable plug is separated (released or detached) from an optical connector of a display apparatus by a user.

In the example embodiments, 'content' may include a broadcast, a video, an image, text or web document. The 'content' may also include the combination of a broadcast, a video, an image, text and web document. The term 'contents' may refer to collection of content.

In the example embodiments, 'a screen of a display apparatus' may include a display of a display apparatus.

The terms used in the following description are provided to explain a specific example embodiment and are not intended to be limiting. A singular term includes a plural form unless otherwise indicated. The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof.

A same reference numeral in each diagram may indicate members that substantively perform a same function.

FIG. 1A is a diagram illustrating a display apparatus and an external apparatus connected with the display apparatus via an optical cable in accordance with an example embodiment.

Figure 1B:
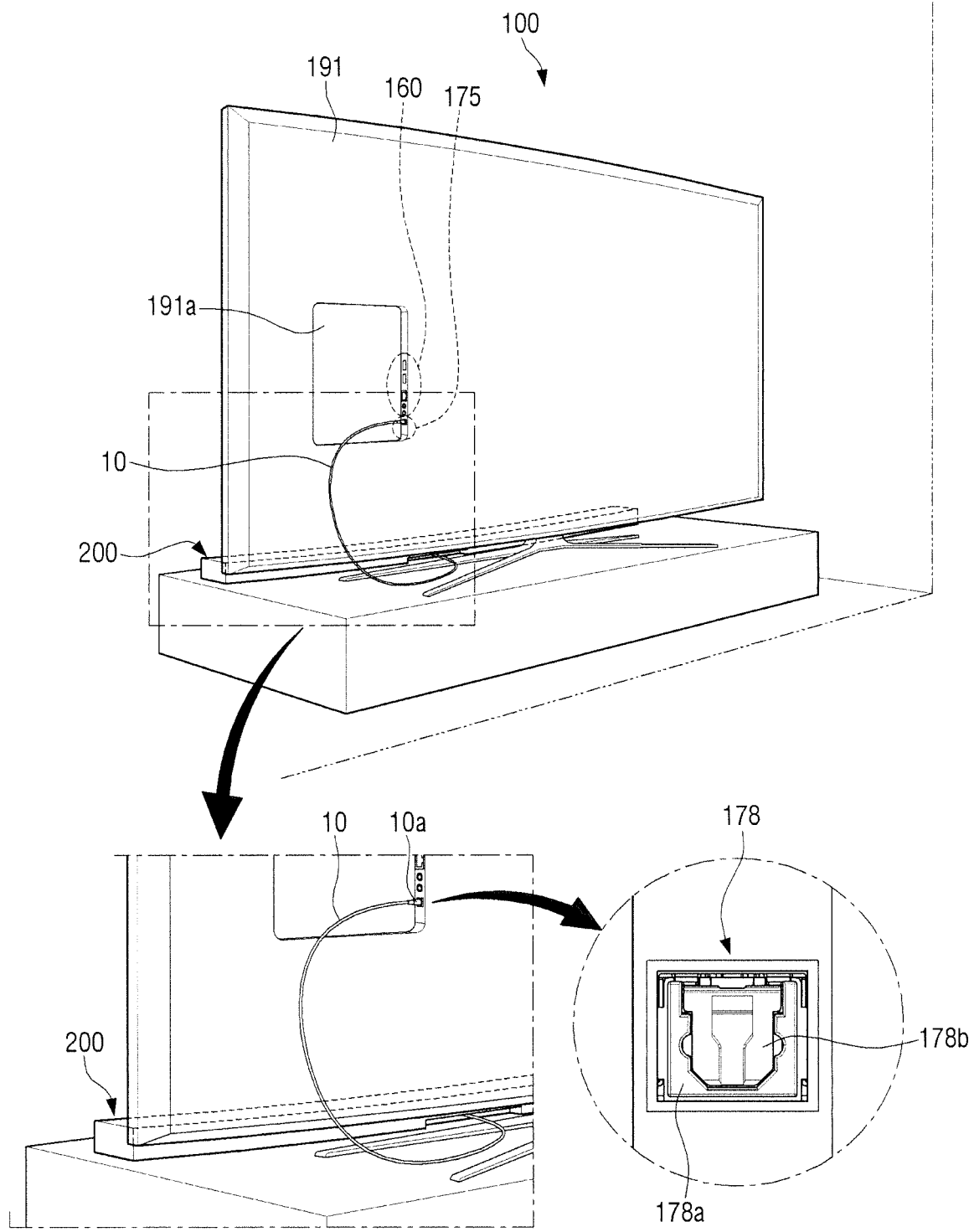
FIG. 1B is a diagram illustrating a rear side of a display apparatus and a rear side of an external apparatus connected via an optical cable according to an example embodiment.

FIG. 1B is a diagram illustrating a rear side of a display apparatus and a rear side of an external apparatus connected via an optical cable in accordance with an example embodiment.

Figure 1C:
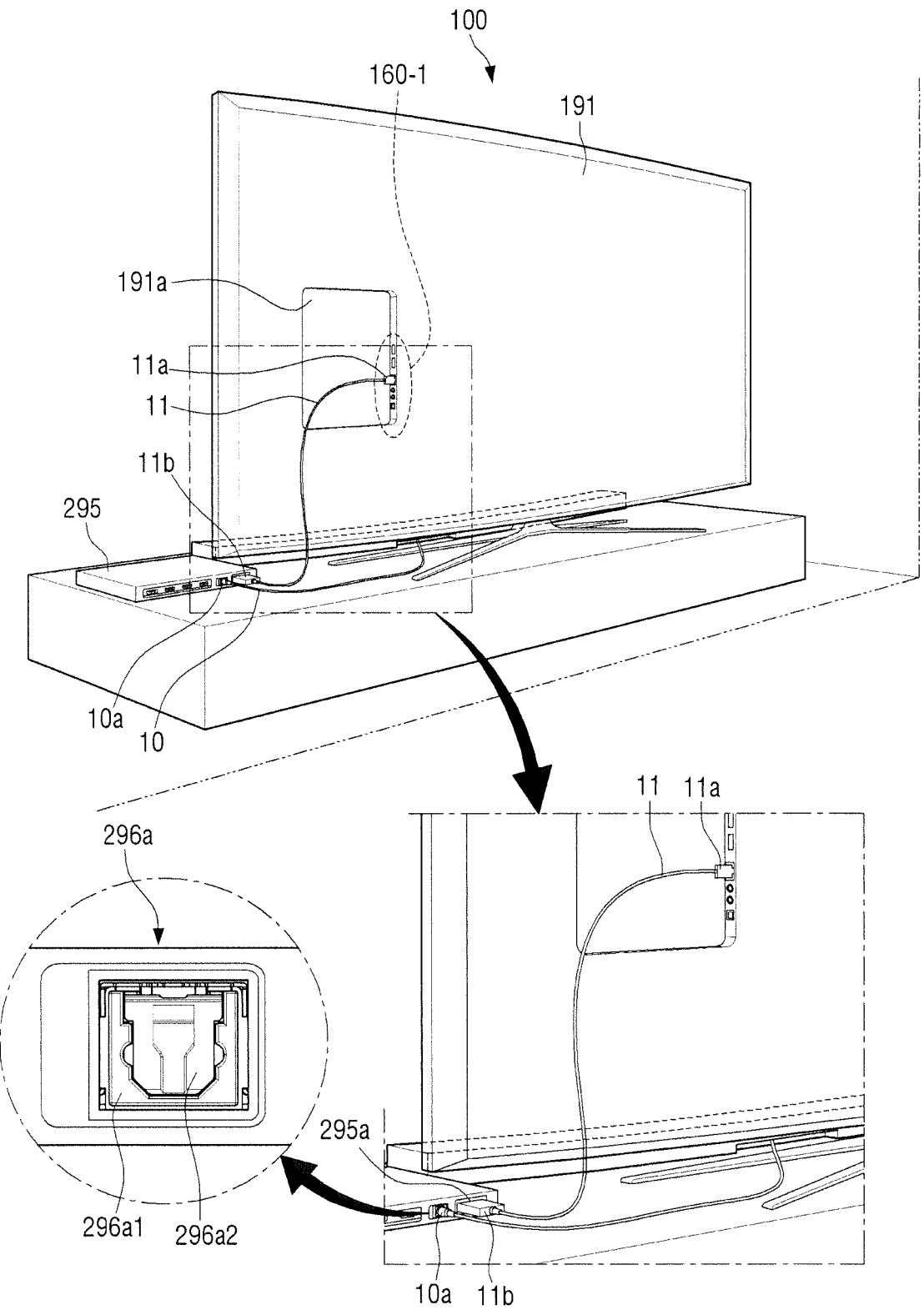
FIG. 1C is a rear side of a display apparatus, and a rear side of a first external apparatus and a rear side of a second external apparatus that is connected with the first external apparatus via an optical cable and is connected with the display apparatus via a dedicated cable according to an example embodiment.

FIG. 1C is a diagram illustrating a rear side of a display apparatus, and a rear side of a first external apparatus and a rear side of a second external apparatus that is connected with the first external apparatus via an optical cable and is connected with the display apparatus via a dedicated cable in accordance with an example embodiment.

FIG. 1A illustrates the display apparatus 100 and the external apparatus 200.

The display apparatus 100 may include a display unit 101 and a stand 105 that supports the display unit 101. The stand 105 may include a wall mount (not illustrated) which fixates (or supports) the display unit 101 on the wall.

The display apparatus 100 may be connected with the external apparatus 200 or a server (not illustrated) via cable or wirelessly. The display 100 and the external apparatus 200 that may be connected with the display apparatus 100 via an optical cable 10 may be displayed. The display apparatus 100 capable of outputting the content 300 including a broadcast on a display 170 (or a screen) may receive content from various sources (e.g., a broadcast, a server, a web, etc.).

The display apparatus 100 may include an analog TV, a digital TV, a 3D-TV, a smart TV, a light emitting diode (LED) TV, an organic light emitting diode (OLED) TV, a quantum dot light emitting diode (QLED) TV, a plasma TVF, a quantum dot TV, a digital signage device (e.g., including one LED display module or a plurality of LED modules arranged in a matrix), and/or a monitor. The display apparatus 100 may include a cell phone, a smartphone, an MP3 player, a video player, a table PC, an electronic blackboard and/or a wearable device. Also, the display apparatus 100 may be implemented as any electronic apparatus connectable to the external apparatus 200 via the optical cable 10.

The display apparatus 100 may be implemented as an analog TV, a digital TV, a 3D-TV, a smart TV, an LED TV, an OLED TV, a plasma TV, a curved TV having a screen of a fixed curvature, a flexible TV having a curvature screen, a bended TV having a screen of a fixed curvature and/or a curvature variable TV in which a curvature of a current screen can be changed by a received user input, etc., but is not limited thereto.

The output resolution of the display apparatus 100 may include, for example, high definition (HD), full HD, ultra HD or higher resolution. The aspect ratio of width to height of a screen of the display apparatus 100 may be, for example, 4:3, 16:9, 16:10, 21:9 and 21:10, or other various ratios.

The external apparatus 200 may include an audio apparatus. The audio apparatus may include, for example, a sound bar, a home theater (not illustrated), a woofer (not illustrated), a speaker (not illustrated) or an amplifier (not illustrated), etc. The external apparatus 200 may be connected with the display apparatus 100 via not only the optical cable 10 but also via other various cables. The external apparatus 200 may also be connected with the display apparatus 100 wirelessly.

The display apparatus 100 may be connected with a remote controller (not illustrated) via cable or wirelessly. The external apparatus 200 may also be connected with the remote controller (not illustrated) via cable or wirelessly. Also, the display apparatus 100 and the external apparatus 200 may be remotely controlled using a common remote controller (not illustrated).

Referring to FIG. 1B, an audio output unit 175 may be exposed in a partial area 191A of a rear cover 191 corresponding to the rear side of the display apparatus 100 according to the example embodiment. Also, an input/output unit 160 may be exposed in the partial area 191A. The partial area 191A may be opened and closed by a separate cover (not illustrated).

The audio output unit 175 may include a plurality of ports or a plurality of jacks. One end 10A (e.g., an optical cable plug) of the optical cable 10 may be connected with an S/PDIF port 178 (e.g., Sony/Philips digital interfaces, an optical connector or an optical port) that is one of the audio output units 175 of the display apparatus 100. The S/PDIF port 178 may be referred to as an optical connector or a digital audio output port. The other end of the optical cable 10 may be connected with the optical connector (not illustrated) of the external apparatus 200.

As shown in FIG. 1C, according to the example embodiment, a dedicated port 165 of the input/output unit 160 that is connected with a separate input/output device 295 via a dedicated cable 11 may be exposed in the partial area 191A of the rear cover 191 corresponding to the rear side of the display apparatus 100. One end 11A of the dedicated cable 11 may be connected to the dedicated port 165 of the display apparatus 100, and the other end 11B may be connected to the dedicated port 295A of the input/output device 295. A part of the input/output unit 160 may be exposed in the partial area 191A. The partial area 191A may be opened and closed by a separate cover (not illustrated).

The separate input/output device 295 may include a plurality of ports or a plurality of jacks. One end 10A (e.g., an optical cable plug) of the optical cable 10 may be connected to a S/PDIF port 296A of the separate input/output device 295. The other end (not illustrated) of the optical cable 10 may be connected to an S/PDIF port (not illustrated) of the external apparatus 200. The separate input/output device 295 including an additional component (e.g., at least one of the elements 110 to 190) may be referred to as 'one connect.'

A power cable (not illustrated) may be connected to the separate input/output device 295. The input/output device 295 may provide to the display apparatus 100 power supplied through the dedicated cable 11 via a power cable.

Figure 2A:
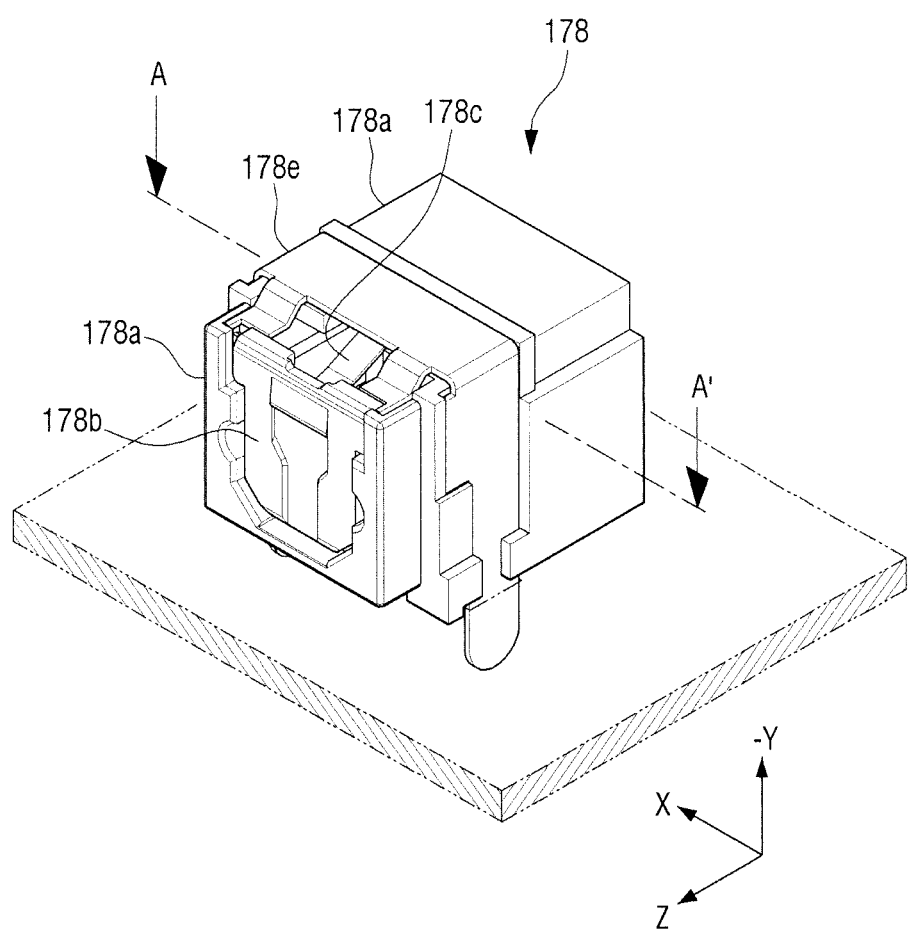
FIGS. 2A and 2B are a combination diagram and a divisional perspective diagram, respectively, illustrating an optical connector of a display apparatus according to an example embodiment.
Figure 2B:
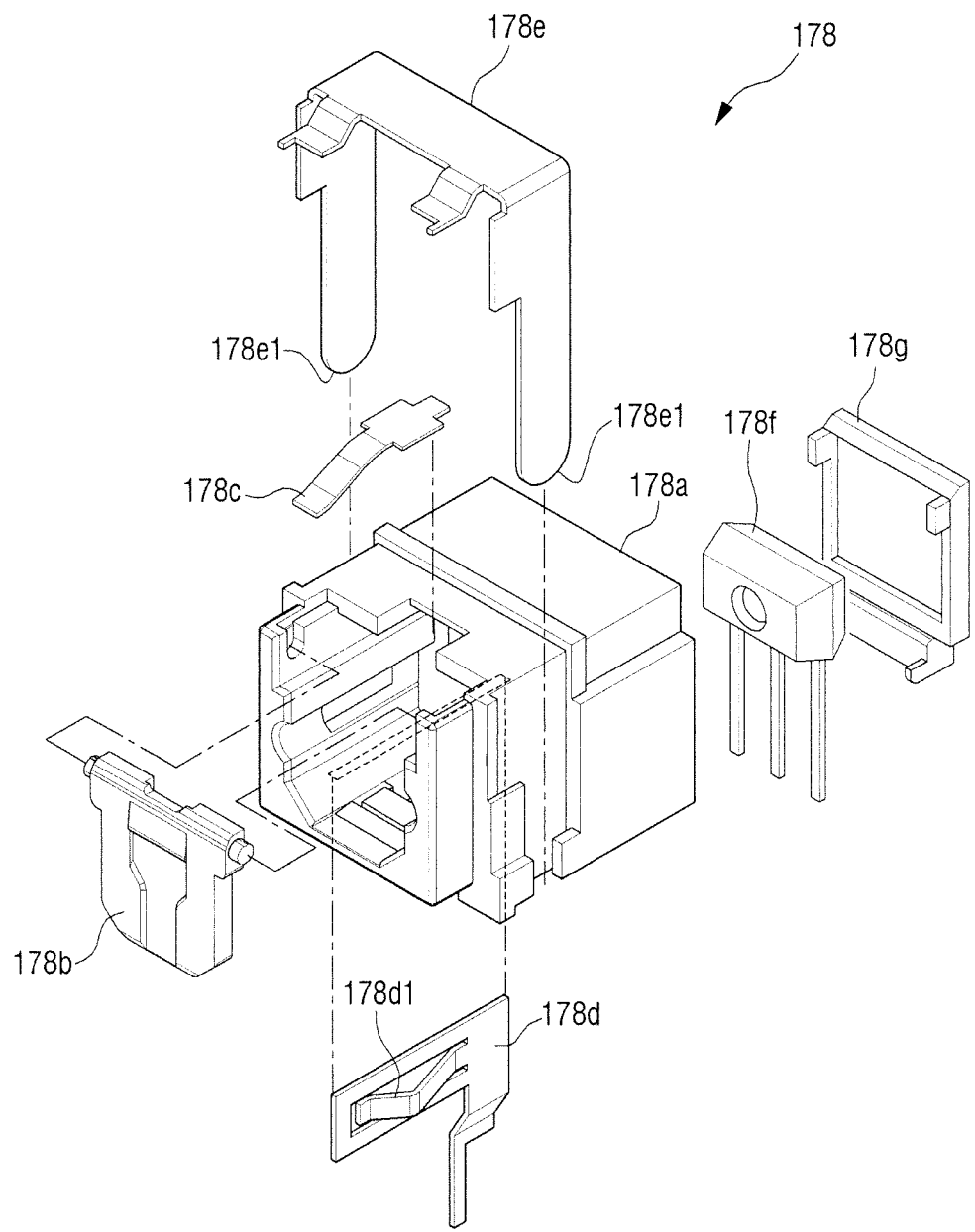

FIGS. 2A and 2B are a combination diagram and a divisional perspective diagram illustrating an optical connector of a display apparatus in accordance with an example embodiment.

Referring to FIGS. 2A and 2B, the S/PDIF port 178 may be equipped in a circuit board (e.g., a PCB or a main board; not illustrated) of the display apparatus 100. The processor 110 may detect whether one end 10A (e.g., an optical cable plug) of the optical cable 10 is inserted using the S/PDIF port 178.

The S/PDIF port 178 may include a main body 178a, a shutter 178B (or a door), an elastic member 178c, a detection pin 178D (or a contact pin), a contact point 178E, an optical element 178F and a cover 178g.

The shutter 178B may rotate (e.g., rotating counter-clockwise) by insertion (or entry) of the optical cable plug 10A with reference to the front surface (e.g., the direction of +x axis; may change) of the main body 178a mounted on the circuit board. When the optical cable plug 10A is separated from the S/PDIF port 178, the shutter 178B may return to the initial position by the elastic member 178c. When the optical cable plug 10A is separated from the S/PDIF port 178, the shutter 178B may rotate (e.g., rotating clockwise) with reference to the front surface of the main body 178a.

The detection pin 178d that is metal material and is combined with the side (or the inner side) of the main body 178a may be contacted with or may be non-contact with the contact point 178E that is mounted on the circuit board (e.g., in the direction of +y axis), is metal material and has both ends 178E1 depending on whether the optical cable plug 10A is inserted in the S/PDIF port 178.

The optical element 178F may output an optical signal to the optical cable 10. The optical element 178 F may receive an optical signal from the optical cable 10. The cover 178g may cover one surface of the main body 178a.

The elements of the S/PDIF port 178 illustrated in FIGS. 2A and 2B are merely example embodiments, and the elements may be added, changed or deleted depending on the structure of the S/PDIF port 178.

Figure 3A:
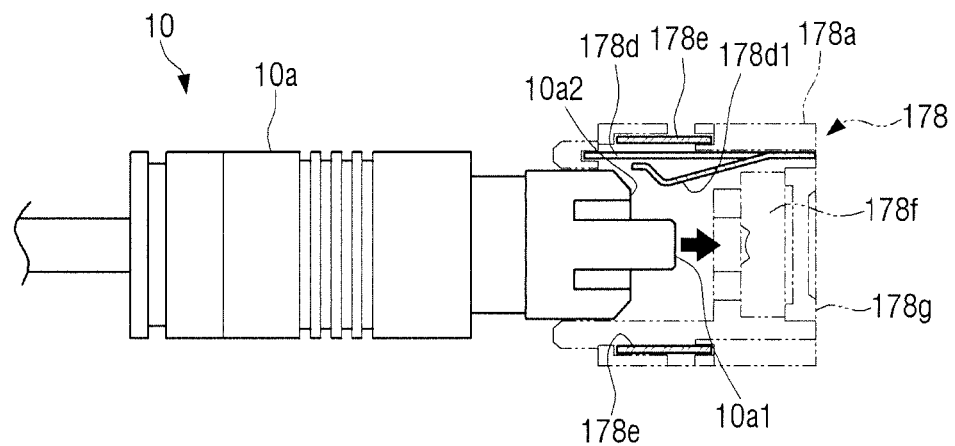
FIGS. 3A and 3B are diagrams illustrating an operation of an optical connector of a display apparatus according to an example embodiment.
Figure 3B:
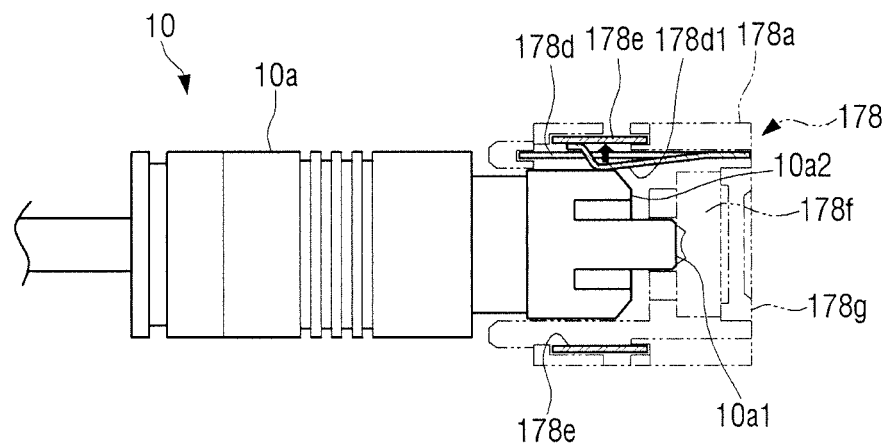

FIGS. 3A and 3B are diagrams illustrating operations of an optical connector of a display apparatus in accordance with an example embodiment.

As shown in FIGS. 3A and 3B, the operations of the optical cable plug 10A and the S/PDIF port 178 may be described with reference to the cross section A-A' of the S/PDIF port 178. Before the optical cable plug 10A is inserted into the S/PDIF port 178, the detection pin 178d may not contact (or may be separated from) the contact point 178E. Before the optical cable plug 10A is inserted into the S/PDIF port 178, the position of a protruded pin 178d1 of the detection pin 178d may not contact with (or be separated from) the contact point 178e.

A user may insert the plug 10A of the optical cable 10 into the S/PDIF port 178 of the display apparatus 100. When the optical cable plug 10A is inserted into the S/PDIF port 178, the first front surface 10A1 of the optical cable plug 10A may gradually approach the optical element 178F of the S/PDIF port 178. Also, the second front surface 10A2 of the optical cable plug 10A may be extended from the inside of the detection pin 178d and approach one surface of the curved protruded pin 178d1.

If the optical cable plug 10A is continuously inserted into the S/PDIF port 178, the second front surface 10A2 of the optical cable plug 10A may contact with the protruded pin 178d1 of the detection pin 178d in the S/PDIF port 178. When the second front surface 10A2 of the optical cable plug 10A contacts with the protruded pin 178d1 of the detection pin 178*d* in the S/PDIF port 178, and the optical cable plug 10A is continuously inserted, the protruded pin 178*d*1 of the detection pin 178*d* in the S/PDIF port 178 may move in the direction of the contact point 178*e* (that is, moving in the direction that intersects with the movement direction of the optical cable plug 10A or approaching the contact point 178*e*) by the second front surface 10A2 of the optical cable plug 10A.

Before the insertion of the optical cable plug 10A into the S/PDIF port 178 is completed, the protruded pin 178*d*1 of the detection pin 178*d* in the S/PDIF port 178 may contact with the contact point 178*e* by continuous insertion of the optical cable plug 10A. When the insertion of the optical cable plug 10A into the S/PDIF port 178 is completed, the protruded pin 178*d*1 of the detection pin 178*d* in the S/PDIF port 178 may contact with the contact point 178*e* by the continuous insertion of the optical cable plug 10A.

An electric signal corresponding to contact between the protruded pin 178*d*1 of the detection pin 178*d* and the contact point 178*e* in the S/PDIF port 178 may be output to the processor 110. The processor 110 may receive (or detect) an electric signal corresponding to contact between the protruded pin 178*d*1 of the detection pin 178*d* in the S/PDIF port 178 and the contact point 178*e*.

The processor 110 may determine (or identify) the combination (or insertion) of the S/PDIF port 178 and the optical cable plug 10A according to the received (or detected) electric signal. In the example embodiments, the term 'determination' may include 'identifiaction.'

The processor 110 may control the insertion information (or combination information) of the S/PDIF port 178 and the optical cable plug 10A to be stored in the storage 180 in response to receiving the electric signal. The insertion information (or combination information) of the S/PDIF port 178 and the optical cable plug 10A may include an identifier and an insertion time of the S/PDIF port 178.

A user may separate (or release) the plug 10A of the inserted optical cable 10 from the S/PDIF port 178 of the display apparatus 100. The separation of the optical cable plug 10A from the S/PDIF port 178 may be in a reverse order of the order of insertion of the optical cable plug 10A into the S/PDIF port 178.

The protruded pin 178*d*1 of the detection pin 178*d* may be spaced apart from the contact point 178*e* in the S/PDIF port 178 according to the separation of the optical cable plug 10A from the S/PDIF port 178. The protruded pin 178*d*1 of the detection pin 178*d* in the S/PDIF port 178 may be spaced apart from the contact point 178*e* by elasticity according to the separation of the optical cable plug 10A from the S/PDIF port 178 so that the protruded pin 178*d*1 may return to the prior position that is before the insertion of the optical cable plug 10A.

The processor 110 may not receive the electric signal that is received in response to contact between the protruded pin 178*d*1 of the detection pin 178*d* in the S/PDIF port 178 and the contact point 178*e* according to the separation of the protruded pin 178*d*1 of the detection pin 178*d* in the S/PDIF port 178 and the contact point 178*e*.

The processor 110 may determine 'separation (or release) of the S/PDIF port 178 and the optical cable plug 10A' in response to the spacing between the protruded pin 178*d*1 of the detection pin 178*d* in the S/PDIF port 178 and the contact point 178*e*.

The processor 110 may control the separation information (or release information) of the S/PDIF port 178 and the optical cable plug 10A to be stored in the storage 180 in response to the separation (or release) of the S/PDIF port 178 and the optical cable plug 10A. The stored separation information (or release information) of the S/PDIF port 178 and the optical cable plug 10A may include an identifier, an insertion time and a separation time of the S/PDIF port 178. The insertion information (or combination information) of the S/PDIF port 178 and the optical cable plug 10A and the separation information (or release information) of the S/PDIF port 178 and the optical cable plug 10A may also be stored as one integrated connection information of the S/PDIF port 178 and the optical cable plug 10A.

Figure 9A:
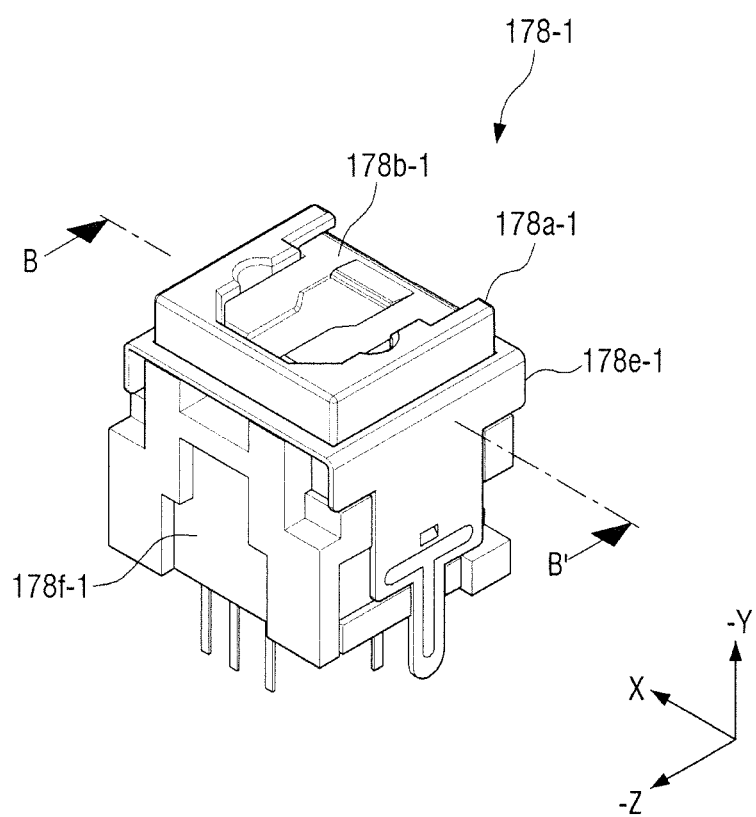
FIGS. 9A and 9B are a schematic combination diagram and a divisional perspective diagram, respectively, illustrating an optical connector of a display apparatus according to another example embodiment.
Figure 9B:
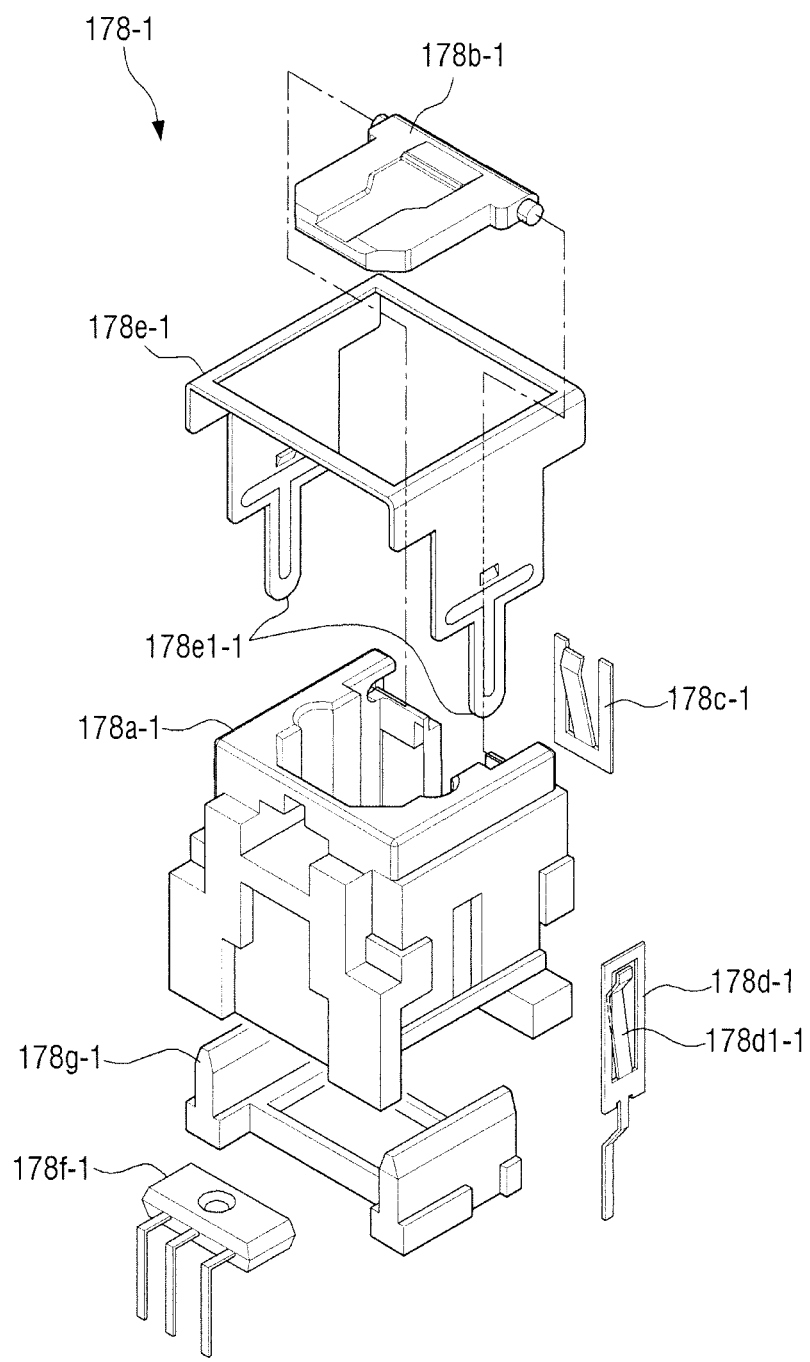

FIGS. 9A and 9B are a schematic combination diagram and a divisional perspective diagram, respectively, illustrating an optical connector of a display apparatus in accordance with another example embodiment.

Figure 10A:
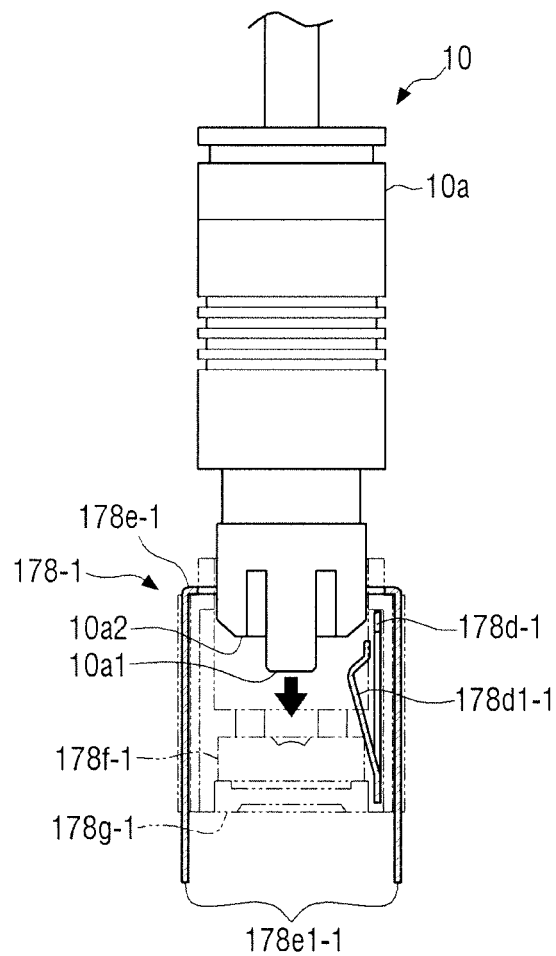
FIGS. 10A and 10B are diagrams illustrating an operation of an optical connector of a display apparatus according to another example embodiment.
Figure 10B:
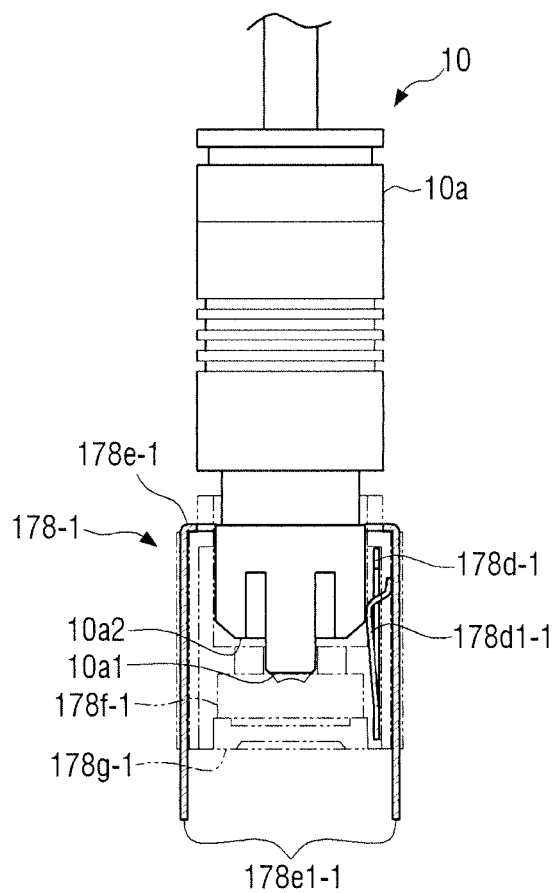

FIG. 10A and FIG. 10B are diagrams illustrating an operation of an optical connector of a display apparatus in accordance with another example embodiment.

According to FIGS. 9A and 9B, the S/PDIF port 178-1 may be mounted on a circuit board (a PCB or a main board; not illustrated) of the display apparatus 100. The processor 110 may detect whether one end (e.g., the optical cable plug 10A) of the optical cable 10 is inserted (or combined) using the S/PDIF port 178-1. The elements of the S/PDIF port 178-1 in FIGS. 9A and 9B are substantively similar to those of the S/PDIF port 178, and thus, the overlapping descriptions will not be repeated.

The S/PDIF port 178-1 may include a main body 178*a*-1, a shutter 178B-1, an elastic member 178*c*-1, a detection pin 178*d*-1, a contract point 178*e*-1, an optical element 178F-1 and a cover 178*g*-1.

The shutter 178B-1 may rotate (e.g., rotating counterclockwise) by insertion (or entry) of the optical cable plug 10A with reference to the upper surface (e.g., −y direction; may change) of the main body 178*a*-1 mounted on the circuit board. When the optical cable plug 10A is separated from the S/PDIF port 178-1, the shutter 178B-1 may return to the initial position by the elastic member 178*c*. When the optical cable plug 10A is separated from the S/PDIF port 178-1, the shutter 178B may rotate (e.g., rotating clockwise) with reference to the front surface of the main body 178*a*-1.

The detection pin 178*d*-1 that is metal material and is combined with the side (or the inner side) of the main body 178*a*-1 may contact or may not contact with the contract point 178*e*-1 that is metal material and has two ends 178*e*1-1 mounted on the circuit board (e.g., present in +y axis) depending on whether the S/PDIF port 178-1 of the optical cable plug 10A is inserted.

The optical element 178*f*-1 may output an optical signal via the optical cable 10. The optical element 178*f*-1 may receive an optical signal from the optical cable 10. Also, the cover 178*g*-1 may cover one surface of the main body 178*a*-1.

The elements 178*a*-1 to 178*g*-1 of the S/PDIF port 178-1 may be merely one example, and the elements may be added, changed, or deleted depending on the structure of the S/PDIF port 178-1.

FIGS. 10A and 10B are diagrams illustrating an operation of an optical connector of a display apparatus in accordance with an example embodiment.

As shown in FIGS. 10A and 10B, the operations of the optical cable plug 10A and the S/PDIF port 178-1 may be described with reference to the cross section B-B' of the S/PDIF port 178-1. Before the optical cable plug 10A is inserted into the S/PDIF port 178-1, the detection pin 178*d*-1 may not contact with (or be spaced apart from) the contact point 178*e*-1. Before the optical cable plug 10A is inserted into the S/PDIF port 178-1, the position of the protruded pin 178*d*1-1 of the detection pin 178*d*-1 may not contact with (or be separate from) the contact point 178*e*-1.

A user may insert the plug 10A of the optical cable 10 into the S/PDIF port 178-1 of the display apparatus 100. When the optical cable plug 10A is inserted into the S/PDIF port 178-1, a first front surface 10A1 of the optical cable plug 10A may gradually approach the optical element 178*f*-1. Also, a second front surface 10A2 of the optical cable plug 10A may approach one surface of the protruded pin 178*d*1-1 that is extended from the inside of the detection pin 178*d*-1 of the S/PDIF port 178-1 and is curved.

When the optical cable plug 10A is continuously inserted into the S/PDIF port 178-1, the second front surface 10A2 of the optical cable plug 10A may contact with the protruded pin 178*d*1-1 of the detection pin 178*d*-1 in the S/PDIF port 178-1. When the second front surface 10A2 of the optical cable plug 10A contacts with the protruded pin 178*d*1-1 of the detection pin 178*d*-1 in the S/PDIF port 178-1, and the optical cable plug 10A is continuously inserted, the protruded pin 178*d*1-1 of the detection pin 178*d*-1 in the S/PDIF port 178-1 may move in the direction of the contact point 178*e*-1 by the second front surface 10A2 of the optical cable plug 10A (in the direction that intersects with the movement direction of the optical cable plug 10A, or approaching the contact point 178*e*-1).

Before the insertion of the optical cable plug 10A into the S/PDIF port 178-1, the protruded pin 178*d*1-1 of the detection pin 178*d*-1 in the S/PDIF port 178-1 may contact with the contact point 178*e*-1 by continuous insertion of the optical cable plug 10A. Also, once the insertion of the optical cable plug 10A into the S/PDIF port 178-1 is completed, the protruded pin 178*d*1-1 of the detection pin 178*d*-1 in the S/PDIF port 178-1 may be in contact with the contact point 178*e* by the continuous insertion of the optical cable plug 10A.

An electric signal corresponding to the contact between the protruded pin 178*d*1-1 of the detection pin 178*d*-1 in the S/PDIF port 178-1 and the contact point 178*e*-1 may be output to the processor 110. The processor 110 may receive (or detect) an electric signal corresponding to the contact between the protruded pin 178*d*1-1 of the detection pin 178*d*-1 in the S/PDIF port 178-1 and the contact point 178*e*-1.

The processor 110 may determine 'combination (or insertion) of the S/PDIF port 178-1 and the optical cable plug 10A' according to the received (or detected) electric signal. The processor 110 may control the insertion information (or combination information) of the S/PDIF port 178-1 and the optical cable plug 10A to be stored in the storage 180 in response to receiving the electric signal. The stored insertion information of the S/PDIF port 178-1 and the optical cable plug 10A may include an identifier and an insertion time of the S/PDIF port 178-1.

A user may separate (or release) the plug 10A of the optical cable 10 from the S/PDIF port 178-1 of the display apparatus 100. The separation of the optical cable plug 10A from the S/PDIF port 178-1 may be performed in a reverse order from the order of the insertion of the optical cable plug 10A into the S/PDIF port 178-1.

The protruded pin 178*d*1-1 of the detection pin 178*d*-1 in the S/PDIF port 178-1 may be spaced apart from the contact point 178*e*-1 according to the separation of the optical cable plug 10A from the S/PDIF port 178-1. The protruded pin 178*d*1-1 of the detection pin 178*d*-1 in the S/PDIF port 178-1 may be spaced apart from the contact point 178*e*-1 according to the separation of the optical cable plug 10A from the S/PDIF port 178-1 by elasticity and return to the position that is before the insertion of the optical cable plug 10A.

The processor 110 may not receive an electric signal received according to contact between the protruded pin 178*d*1-1 of the detection pin 178*d*-1 in the S/PDIF port 178-1 and the contact point 178*e*-1 in response to the spacing between the protruded pin 178*d*1-1 of the detection pin 178*d*-1 in the S/PDIF port 178-1 and the contact point 178*e*-1.

The processor 110 may determine 'separation (or release) of the S/PDIF port 178-1 and the optical cable plug 10A' in response to the spacing between the protruded pin 178*d*1-1 of the detection pin 178*d*-1 in the S/PDIF port 178-1 and the contact point 178*e*-1.

The processor 110 may control the separation information (or release information) of the S/PDIF port 178-1 and the optical cable plug 10A to be stored in the storage 180 in response to the separation (or release) of the S/PDIF port 178-1 and the optical cable plug 10A. The stored separation information (or release information) of the S/PDIF port 178-1 and the optical cable plug 10A may include an identifier, an insertion time and a separation time. The insertion information (or combination information) of the S/PDIF port 178-1 and the optical cable plug 10A and the separation information (or release information) of the S/PDIF port 178-1 and the optical cable plug 10A may be stored as one integrated connection information of the S/PDIF port 178-1 and the optical cable plug 10A.

Figure 11A:
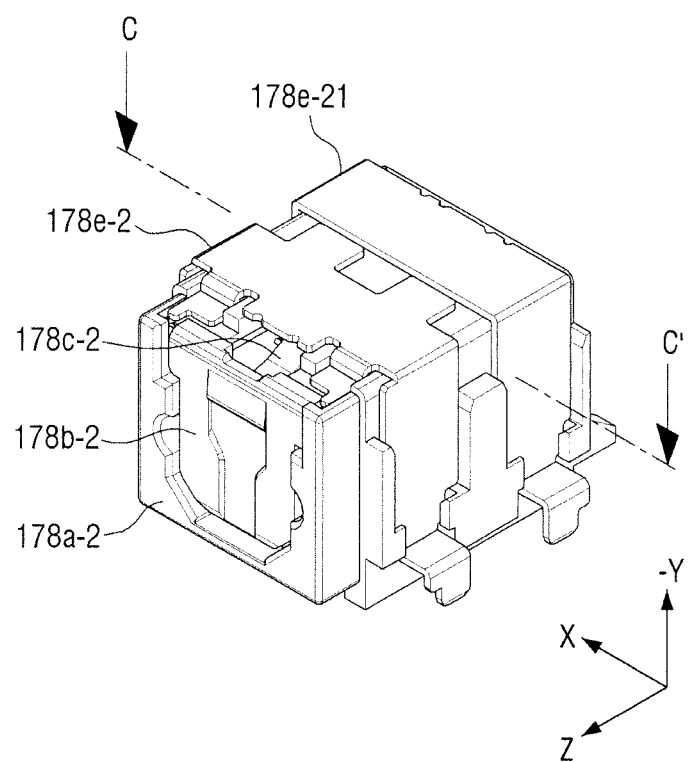
FIGS. 11A and 11B are a schematic combination diagram and a divisional perspective diagram, respectively, illustrating an optical connector of a display apparatus according to another example embodiment.
Figure 11B:
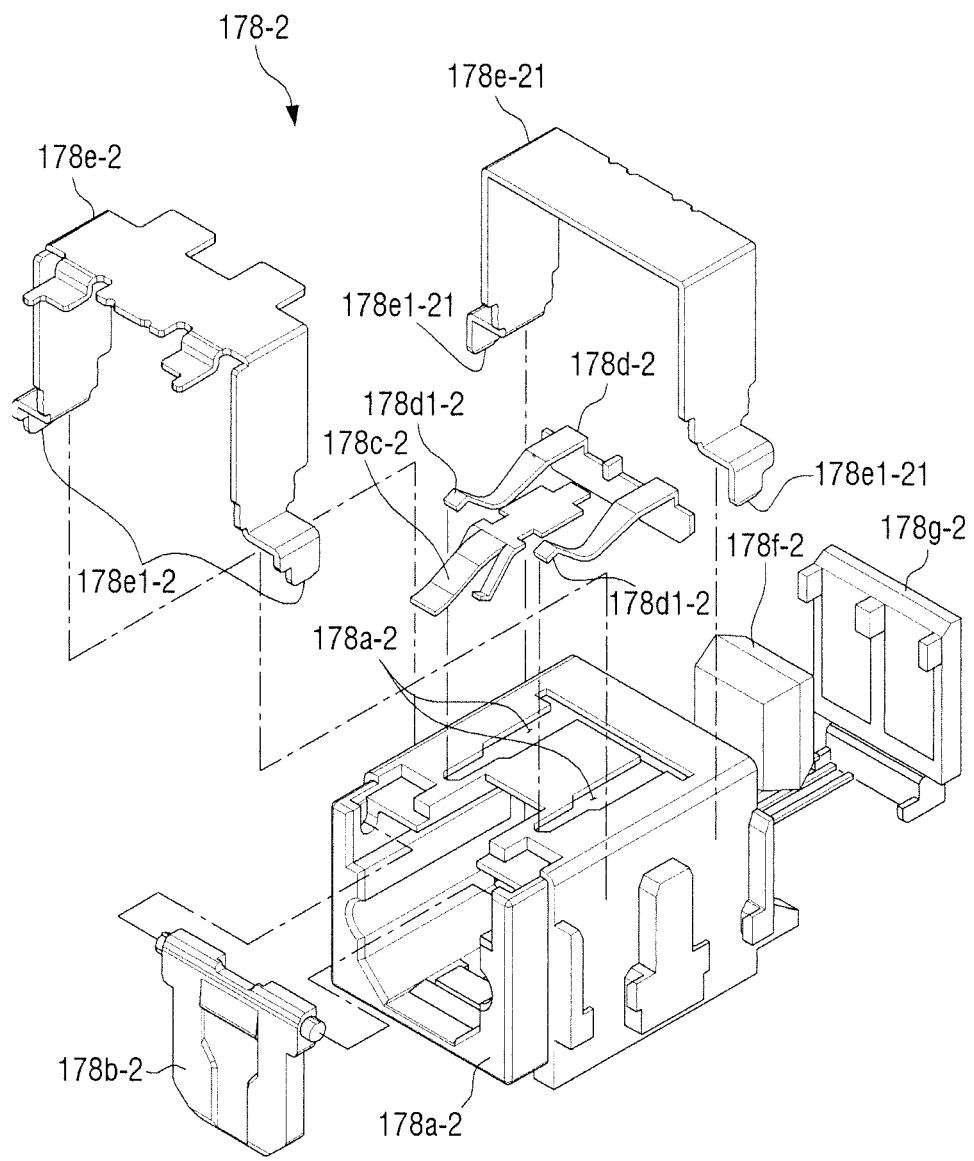

FIGS. 11A and 11B are a combination diagram and a divisional perspective diagram, respectively, illustrating an optical connector of a display apparatus in accordance with another example embodiment.

Figure 12A:
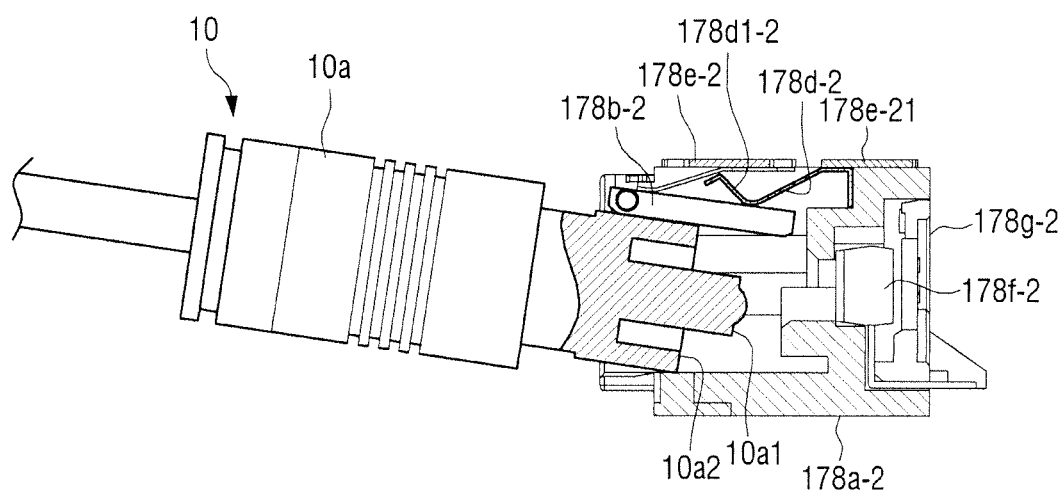
FIGS. 12A and 12B are diagrams illustrating an operation of an optical connector of a display apparatus according to another example embodiment.
Figure 12B:
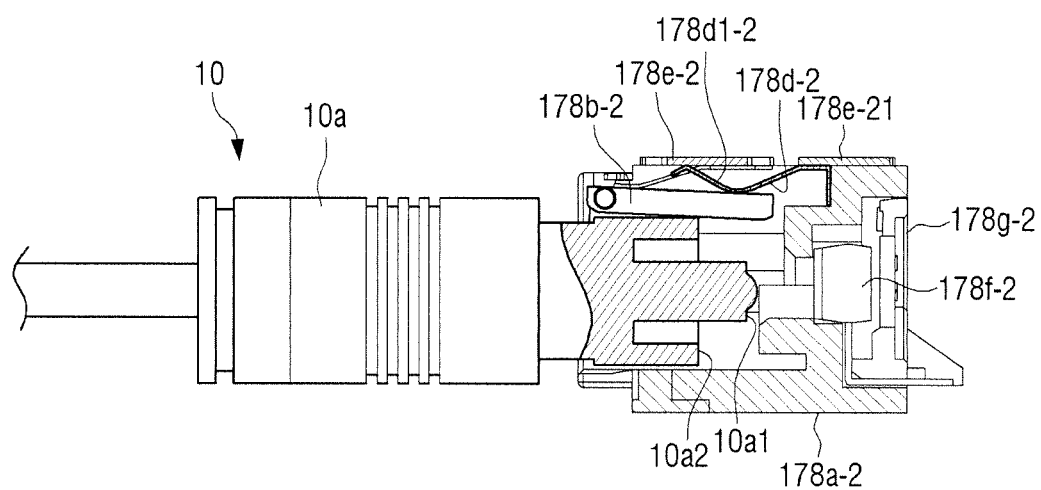

FIGS. 12A and 12B are diagrams illustrating an operation of an optical connector of a display apparatus in accordance with another example embodiment.

Referring to FIGS. 11A and 11B, the S/PDIF port 178-2 may be mounted on a circuit board of the display apparatus 100. The processor 110 may detect whether one end of the optical cable 10 is inserted (or combined) using the S/PDIF port 178-2.

The S/PDIF port 178-2 may include a shutter 178B-2, an elastic member 178*c*-2, a detection pin 178*d*-2, a first contact point 178*e*-2, a second contact point 178*e*-21, an optical element 178*f*-2 and a cover 178*g*-2.

The shutter 178B-2 may rotate (e.g., rotating counterclockwise) by insertion (or entry) of the optical cable plug 10A with reference to the front surface (e.g., the direction of +x axis; may change) of the main body 178*a*-2 mounted on the circuit board. When the optical cable plug 10A is separated from the S/PDIF port 178-2, the shutter 178B-2 may return to the initial position by the elastic member 178*c*-2. When the optical cable plug 10A is separated from the S/PDIF port 178-2, the shutter 178B-2 may rotate (rotating clockwise) with reference to the front surface of the main body 178*a*-2.

The detection pin 178*d*-2 that is metal material, and is partially exposed on the upper surface of the main body 178*a*-2 and contacts with the second contact point 178*e*-21 may contact or may not contact with the first contact point 178*e*-2 that is metal material and has two ends 178*e*1-2 mounted on a circuit board (e.g., present in the direction of +y axis) depending on whether the optical cable plug 10A is inserted into the S/PDIF port 178-2.

The optical element 178*f*-2 may output an optical signal to the optical cable 10. The optical element 178*f*-2 may receive an optical signal from the optical cable 10. Also, the cover 178g-2 may cover one surface of the main body 178a-2.

The elements 178a-2 to 178g-2 of the S/PDIF port 178-2 in FIGS. 11A and 11B are one example, and the elements may be added, changed or deleted depending on the structure of the S/PDIF port 178-2.

FIGS. 12A and 12B are diagrams illustrating an operation of an optical connector of a display apparatus in accordance with an example embodiment.

As shown in FIGS. 12A and 12B, the operations of the optical cable plug 10A and the S/PDIF port 178-2 may be described with reference to the cross section (C-C') of the S/PDIF port 178-2. Before the optical cable plug 10A is inserted into the S/PDIF port 178-2, the detection pin 178d-2 contacted with the second contact point 178e-21 may not contact with (or be spaced apart from) the first contact point 178e-2. Before the optical cable plug 10A is inserted into the S/PDIF port 178-2, the position of the protruded pin 178d1-2 178d of the detection pin 178d-2178d that contacts with the second contact point 178e-21 may not contact with (or be spaced apart from) the first contact point 178e-2.

A user may insert the plug 10A of the optical cable 10 into the S/PDIF port 178-2 of the display apparatus 100. When the optical cable 10A is inserted into the S/PDIF port 178-2, the first front surface(s) 10A1 of the optical cable plug 10A may gradually approach the optical element 178f-2. Also, the second front surface 10A2 of the optical cable plug 10A may approach one or more surface of the protruded pin 178d1-2 that is extended from the inside of the detection pin 178d-2 of the S/PDIF port 178-2 and is curved.

When the optical cable plug 10A is continuously inserted into the S/PDIF port 178-2, the second front surface 10A2 of the optical cable plug 10A may contact with the protruded pin 178d1-2 of the detection pin 178d-2 in the S/PDIF port 178-2. When the second front surface 10A2 of the optical cable plug 10A contacts with the protruded pin 178d1-2 of the detection pin 178d-2 in the S/PDIF port 178-2, and the optical cable plug 10A is continuously inserted, the protruded pin 178d1-2 of the detection pin 178d-2 in the S/PDIF port 178-2 may move in the direction of the first contact point 178e-2 (in the direction that intersects with the movement direction of the optical cable plug 10A, or approaching the first contact point 178e-2).

Before the insertion of the optical cable plug 10A into the S/PDIF port 178-2 is completed, the protruded pin 178d1-2 of the detection pin 178d-2 in the S/PDIF port 178-2 may contact with the first contact point 178e-2 by the continuous insertion of the optical cable plug 10A. Also, when the insertion of the optical cable plug 10A into the S/PDIF port 178-2 is completed, the protruded pin 178d1-2 of the detection pin 178d-2 in the S/PDIF port 178-2 may be in contact with the first contact point 178e-2.

An electric signal corresponding to contact between the protruded pin 178d1-2 of the detection pin 178d-2 in the S/PDIF port 178-2 and the first contact point 178e-2 may be output to the processor 110. The processor 110 may receive (or detect) an electric signal corresponding to the contact between the protruded pin 178d1-2 of the detection pin 178d-2 in the S/PDIF port 178-2 and the first contact point 178e-2.

The processor 110 may determine 'combination (or insertion) of the S/PDIF port 178-2 and the optical cable plug 10A' according to the received (or detected) electric signal. The processor 110 may control the insertion information (or combination information) of the S/PDIF port 178-2 and the optical cable plug 10A to be stored in the storage 180 in response to receiving the electric signal. The stored insertion information (or combination information) of the S/PDIF port 178-2 and the optical cable plug 10A may include an identifier and an insertion time of the S/PDIF port 178-2.

A user may separate (or release) the inserted plug 10A of the optical cable 10 from the S/PDIF port 178-2 of the display apparatus 100. The separation of the optical cable 10A from the S/PDIF port 178-2 may be performed in a reverse order from the order of the insertion of the optical cable plug 10A into the S/PDIF port 178-2.

The protruded pin 178d1-2 of the detection pin 178d-2 in the S/PDIF port 178-2 may be spaced apart from the first contact point 178e-2 according to the separation of the optical cable plug 10A from the S/PDIF port 178-2. The protruded pin 178d1-2 of the detection pin 178d-2 in the S/PDIF port 178-2 may be spaced apart from the first contact point 178e-2 by elasticity according to the separation of the optical cable plug 10A from the S/PDIF port 178-2, and the optical cable plug 10A may return to the position that is before the insertion of the optical cable plug 10A.

The processor 110 may not receive an electric signal that is received in response to contact between the protruded pin 178d1-2 of the detection pin 178d-2 in the S/PDIF port 178-2 and the first contact point 178e-2 according to the spacing between the protruded pin 178d1-2 of the detection pin 178d-2 in the S/PDIF port 178-2 and the first contact point 178e-2.

The processor 110 may determine 'separation (or release) of the S/PDIF port 178-2 and the optical cable plug 10A' according to the spacing between the protruded pin 178d1-2 of the detection pin 178d-2 in the S/PDIF port 178-2 and the first contact point 178e-2.

The processor 110 may control the separation information (or release information) of the S/PDIF port 178-2 and the first contact point 178e-2 to be stored in the storage 180 according to the separation (or release) of the S/PDIF port 178-2 and the first contact point 178e-2. The stored separation information (or release information) of the S/PDIF port 178-2 and the first contact point 178e-2 may include an identifier, an insertion time and a separation time of the S/PDIF port 178-2. The insertion information (or combination information) of the S/PDIF port 178-2 and the optical cable plug 10A and the separation information (or release information) of the S/PDIF port 178-2 and the optical cable plug 10A may be stored as one integrated connection information of the S/PDIF port 178-2 and the optical cable plug 10A.

Figure 13A:
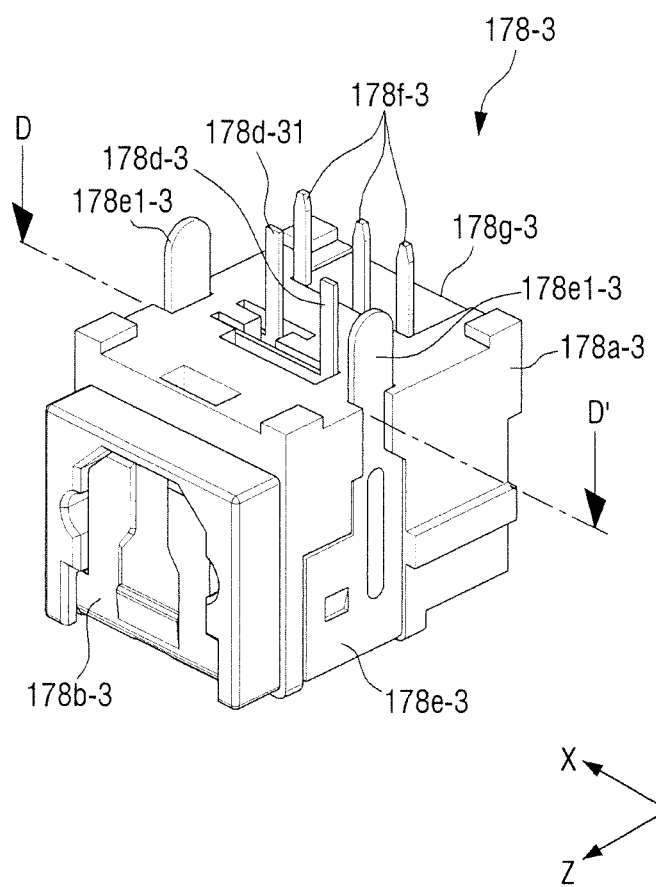
FIGS. 13A and 13B are a schematic combination diagram and a divisional perspective diagram, respectively, illustrating an optical connector of a display apparatus according to another example embodiment.

FIGS. 13A and 13 B are a combination diagram and a divisional perspective diagram illustrating an optical connector of a display apparatus in accordance with another example embodiment.

Figure 14A:
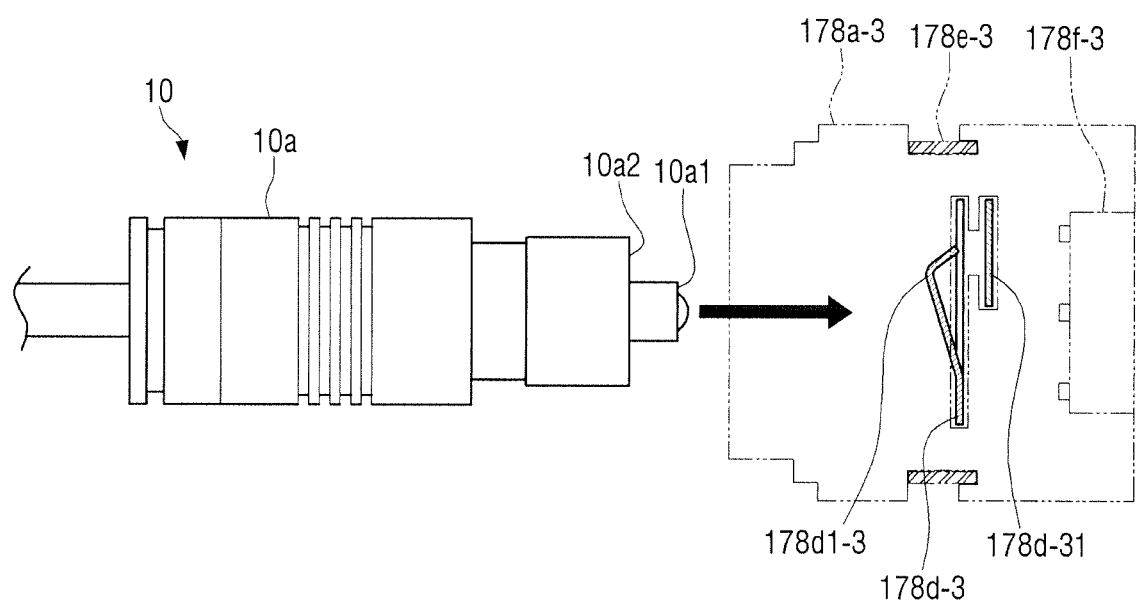
FIGS. 14A and 14B are diagrams illustrating an operation of an optical connector of a display apparatus according to another example embodiment.
Figure 14B:
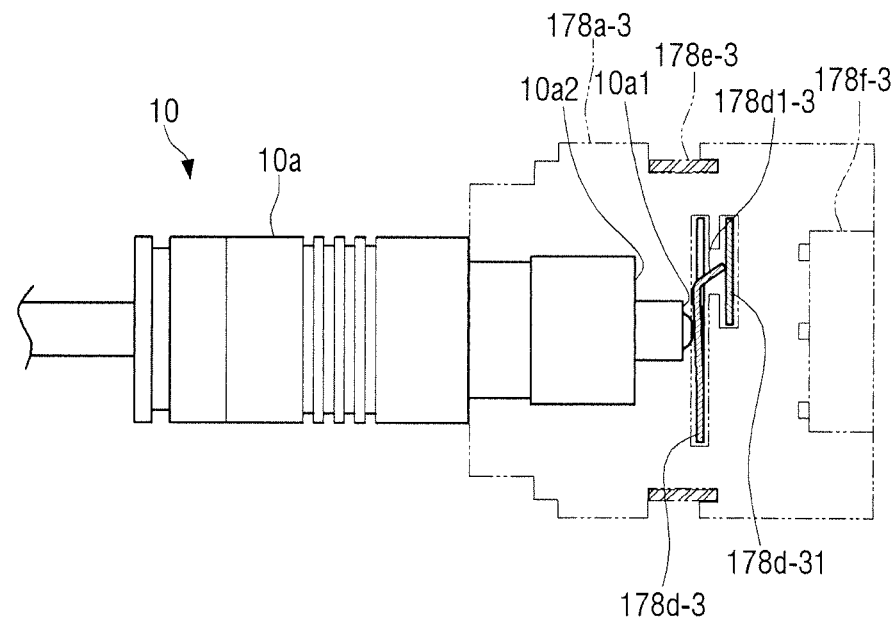

FIGS. 14A and 14B are diagrams illustrating an operation of an optical connector of a display apparatus in accordance with another example embodiment.

Figure 13B:
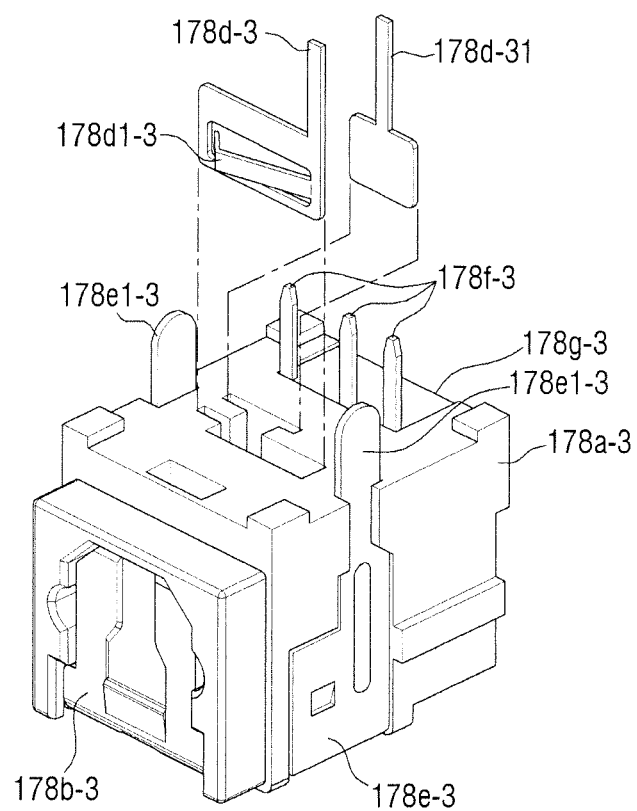

As shown in FIGS. 13A and 13B, the S/PDIF port 178-3 may be mounted on a circuit board of the display apparatus 100. The processor 110 may detect insertion (or combination) of one end 10A of the optical cable 10 using the S/PDIF port 178-3.

The S/PDIF port 178-3 may include a main body 178a-3, a shutter 178b-3, an elastic member 178c-3, a first detection pin 178d-3, a second detection pin 178d-31, a contact point 178e-3, an optical element 178f-3 and a cover 178g-3.

The shutter 178b-3 may rotate (e.g., rotate counter-clockwise) by insertion (or entry) of the optical cable plug 10A with reference to the front surface (e.g., +x direction; may change) of the main body 178a-3 mounted on the circuit board. When the optical cable plug 10A is separated from the S/PDIF port 178-3, the shutter 178b-3 may return to the initial position by the elastic member 178c-3. When the optical cable plug 10A is separated from the S/PDIF port 178-3, the shutter 178b-3 may rotate (e.g., rotate clockwise) with reference to the front surface of the main body 178a-3.

The first detection pin 178d-3 that is metal material, and is partially exposed on the lower surface and is mounted on a circuit board may contact or may not contact with the second contact point 178d-31 that is metal material and is mounted on the circuit board (e.g., present in the +y direction) depending on the insertion of the optical cable plug 10A into the S/PDIF port 178-3.

The optical element 178f-3 may output an optical signal to the optical cable 10. The optical element 178f-3 may receive an optical signal from the optical cable 10. Also, the cover 178g-3 may cover one surface of the main body 178a-3.

The elements 178a-3 to 178g-3 of the S/PDIF port 178-3 in FIGS. 13A and 13B may be merely one example, and the elements may be added, changed, or deleted depending on the structure of the S/PDIF port 178-3.

FIGS. 14A and 14B are diagrams illustrating an operation of an optical connector of a display apparatus in accordance with another example embodiment.

As shown in FIGS. 14A and 14B, the operations of the optical cable plug 10A and the S/PDIF port 178-3 may be described with reference to the cross section D-D' of the S/PDIF port 178-3. Before the optical cable plug 10A is inserted into the S/PDIF port 178-3, the first detection pin 178d-3 and the second detection pin 178d-31 may not contact with each other (or be spaced from each other). Before the optical cable plug 10A is inserted into the S/PDIF port 178-3, the position of the protruded pin 178d1-3 of the first detection pin 178d-3 may not be in contact with (or may be spaced from) the second detection pin 178d-31.

A user may insert the plug 10A of the optical cable 10 into the S/PDIF port 178-3 of the display apparatus 100. When the optical cable plug 10A is inserted into the S/PDIF port 178-3, the first front 10A1 of the optical cable plug 10A may gradually approach the optical element 178f-3 of the S/PDIF port 178-3. Also, the second front 10A2 of the optical cable plug 10A may approach one or more surface(s) of the protruded pin 178d1-3 that is extended from the inside of the first detection pin 178d-3 of the S/PDIF port 178-3 and is curved.

When the optical cable plug 10A is continuously inserted into the S/PDIF port 178-3, the second front surface 10A2 of the optical cable plug 10A may contact with the protruded pin 178d1-3 of the first detection pin 178d-3. When the second front surface 10A2 of the optical cable plug 10A contacts with the protruded pin 178d1-3 of the detection pin 178d-3 in the S/PDIF port 178-3, and the optical cable plug 10A is continuously inserted, the protruded pin 178d1-3 of the first detection pin 178d-3 in the S/PDIF port 178-3 may move in the direction of the second detection pin 178d-31 (in the direction that intersects with the movement direction of the optical cable plug 10A or approaching the second detection pin 178d-31).

Before the insertion of the optical cable plug 10A into the S/PDIF port 178-3 is completed, the protruded pin 178d1-3 of the first detection pin 178d-3 in the S/PDIF port 178-3 may contact with the second detection pin 178d-31 by the continuous insertion of the optical cable plug 10A. Also, when the insertion of the optical cable plug 10A into the S/PDIF port 178-3 is completed, the protruded pin 178d1-3 of the first detection pin 178d-3 in the S/PDIF port 178-3 may be in contact with the second detection pin 178d-31 by the continuous insertion of the optical cable plug 10A.

An electric signal corresponding to contact between the protruded pin 178d1-3 of the first detection pin 178d-3 in the S/PDIF port 178-3 and the second detection pin 178d-31 may be output to the processor 110. The processor 110 may receive (or detect) the electric signal corresponding to the contact between the protruded pin 178d1-3 of the first detection pin 178d-3 in the S/PDIF port 178-3 and the second detection pin 178d-31.

The processor 110 may determine 'combination (or insertion) of the S/PDIF port 178-3 and the optical cable plug 10A' in response to the received electric signal. The controller 100 may control the insertion information (or combination information) of the S/PDIF port 178-3 and the optical cable plug 10A to be stored in the storage 180 in response to receiving the electric signal. The stored insertion information (or combination information) of the S/PDIF port 178-3 and the optical cable plug 10A may include an identifier and an insertion time of the S/PDIF port 178-3.

A user may separate (or release) the plug 10A of the optical cable 10 from the S/PDIF port 178-3 of the display apparatus 100. The order of separation of the optical cable plug 10A from the S/PDIF port 178-3 may be a reverse order of the order of insertion of the optical cable plug 10A into the S/PDIF port 178-3.

The protruded pin 178d1-3 of the first detection pin 178d-3 in the S/PDIF port 178-3 may be spaced apart from the second detection pin 178d-3I according to the separation of the optical cable plug 10A from the S/PDIF port 178-3. The protruded pin 178d1-3 of the first detection pin 178d-3 in the S/PDIF port 178-3 may be spaced apart from the second detection pin 178d-31 by elasticity according to the separation of the optical cable plug 10A from the S/PDIF port 178-3 and return to the position that is before the insertion of the optical cable plug 10A.

The processor 110 may not receive an electric signal that is received in response to contact between the protruded pin 178d1-3 of the first detection pin 178d-3 in the S/PDIF port 178-3 and the second detection pin 178d-31 according to the spacing between the protruded pin 178d1-3 of the first detection pin 178d-3 in the S/PDIF port 178-3 and the second detection pin 178d-31.

The processor 110 may determine separation (or release) of the S/PDIF port 178-3 and the optical cable plug 10A' in response to the spacing between the protruded pin 178d1-3 of the first detection pin 178d-3 in the S/PDIF port 178-3 and the second detection pin 178d-31.

The processor 110 may control the separation information (or release information) of the S/PDIF port 178-3 and the optical cable plug 10A to be stored in the storage 180 in response to the separation (or release) of the S/PDIF port 178-3 and the optical cable plug 10A. The stored separation information (or release information) of the S/PDIF port 178-3 and the optical cable plug 10A may include an identifier, an insertion time and a separation time of the S/PDIF port 178-3. The insertion information (or combination information) of the S/PDIF port 178-3 and the optical cable plug 10A and the separation information (or release information) of the S/PDIF port 178-3 and the optical cable plug 10A may be stored as one integrated connection information of the S/PDIF port 178-3 and the optical cable plug 10A.

In the example embodiment, the term 'S/PDIF port' may include the S/PDIF ports 178 to 178-3. Also, the elements of the S/PDIF port may include the elements of the S/PDIF ports 178 to 178-3.

Figure 4:
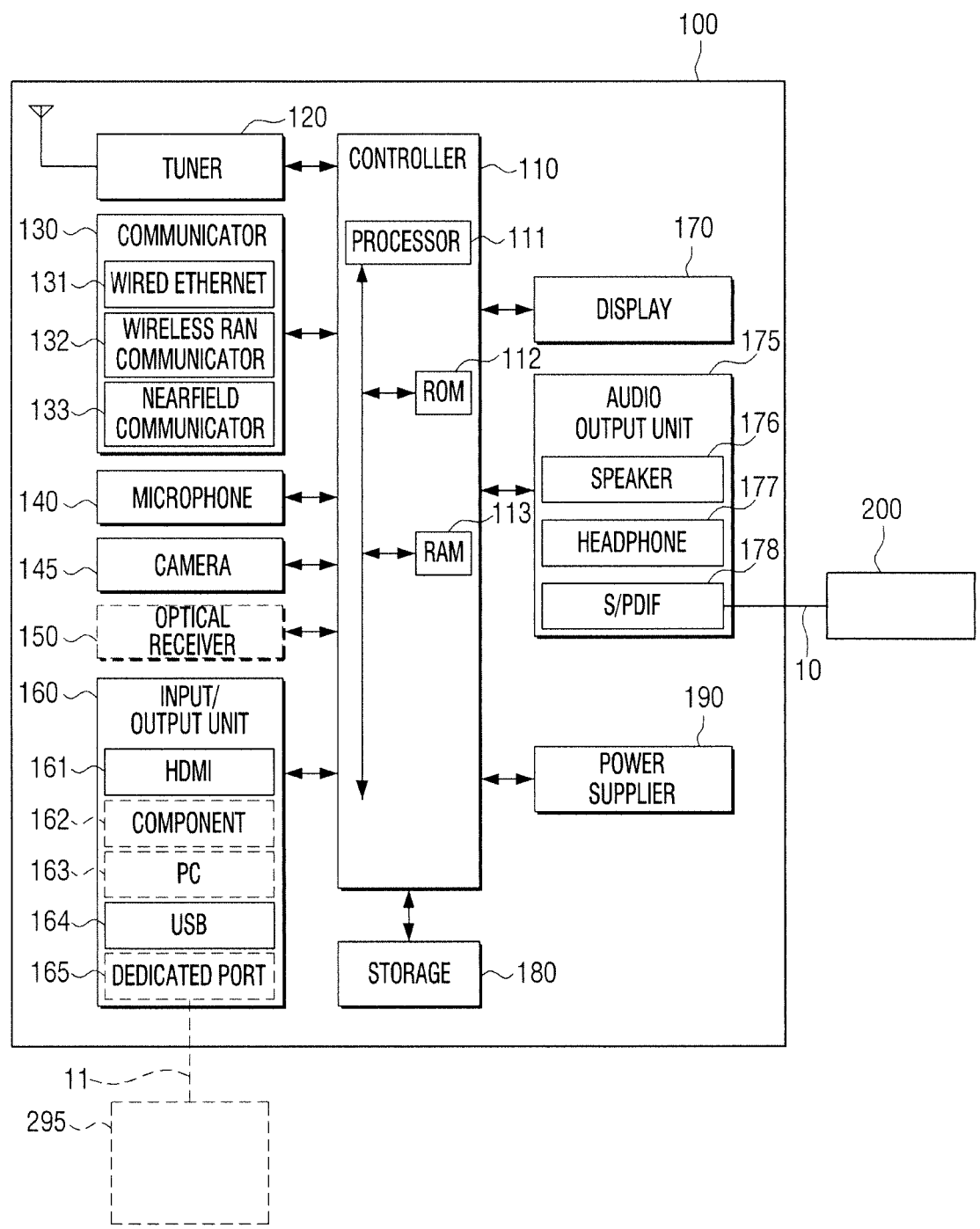
FIG. 4 is a block diagram illustrating a control method of a display apparatus according to an example embodiment.

FIG. 4 is a block diagram illustrating a control method of a display apparatus in accordance with an example embodiment.

As show in FIG. 4, the display apparatus 100 connected with the external apparatus 200 via cable may be connected with another external device (e.g., one server or a plurality of servers) via cable or wirelessly using a communicator 130 or an input/output unit 160.

The display apparatus 100 receiving an electric signal from a remote controller (not illustrated) may transmit the received electric signal (or a packet corresponding to the electric signal) to another external apparatus (e.g., one server or a plurality of servers) that is connected via cable or wirelessly using the communicator 130 or the input/output unit 160. The other external apparatus may include a server, a cell phone (not illustrated), a smartphone (not illustrated), a tablet PC (not illustrated) and a PC (not illustrated).

The display apparatus 100 may include a tuner 120, a communicator 130, a microphone 140, a camera 145, an optical receiver 150, an input/output unit 160, a display 170, an audio output unit 175, a storage 180 and a power supplier 190. The display apparatus 100 may include a sensor (e.g., an illumination sensor, a temperature sensor, etc.; not illustrated) which detects an internal state or an external state of the display apparatus 100.

The processor 110 may include a processor chip 111, a ROM (or a non-volatile memory 112) in which a control program for controlling the display apparatus 100 is stored and a RAM (or a volatile memory 113) which stores a signal or data input from the outside of the display apparatus 100 or is used as a storage area corresponding to various tasks performed in the display apparatus 100. Here, the processor 110 may be referred as a controller, but will be collectively referred to as a processor for convenience of explanation.

The processor 110 may control overall operations of the display apparatus 100 and a signal flow between the internal elements 100 to 190 of the display apparatus 100, and process data. The processor 110 may control power supplied to the internal elements 110 to 190 from the power supplier 190. Also, when there is a user input, or a predetermined and stored condition is satisfied, the processor 110 may execute an operating system (OS) or various applications stored in the storage 180.

The processor chip 111 may further include a graphic processor (not illustrated) for processing graphic corresponding to an image or a video. The processor chip 111 may include a graphic processor (not illustrated), or a graphic processor may be implemented as a separate component. The processor chip 111 may be implemented as a system on chip (SOC) including a core (not illustrated) and a graphic processor (not illustrated). Also, the processor chip 111 may be implemented as an SOC including at least one of a ROM 112 and a RAM 113. The processor chip 111 may include a single core, a dual core, a triple core, a quad core or more number of cores.

The processor chip 111 of the display apparatus 100 may include a plurality of processors. The plurality of processors may include a main processor (not illustrated) and a sub processor (not illustrated) that operates in a screen-off state (or a screen [power] off state while a power plug is connected) which is one of the operation states of the display apparatus 100. Also, the plurality of processors may further include a sensor processor (not illustrated) that controls a sensor (not illustrated).

The processor chip 111, the ROM 112 and the RAM 113 may be connected with one another via a bus.

In the example embodiments, the term 'a controller of the display apparatus 100' may include the processor chip 111, the ROM 112 and the RAM 113 of the display apparatus 100. Also, the term 'a controller of the display apparatus 100' may refer to the processor chip 111 of the display apparatus 100 in the example embodiments. The term 'a controller of the display apparatus 100' may also include the main processor, the sub processor, the ROM 112 and the RAM 113 of the display apparatus 100.

The elements and operations of the controller 210 may be implemented in various ways in accordance with an example embodiment.

The tuner 120 may tune and select only the frequency of a channel that the display apparatus 100 intends to receive among a variety of wave components by amplification, mixing, resonance, etc. of a broadcast signal received via cable or wirelessly. The broadcast signal may include a video, an audio and additional data (e.g., an electronic program guide [EPG]).

The tuner 120 may receive a video, audio and data in a frequency band that corresponds to a channel number (e.g., a cable broadcasting channel No. 506) corresponding to a user input (e.g., voice, a motion, a button input, a touch input, etc.). The tuner 120 may receive a broadcast signal from various sources such as terrestrial broadcasting, cable broadcasting, satellite broadcasting and Internet broadcasting, etc.

The tuner 120 may be implemented to be integrated into (as an all-in-one type) the display apparatus 100, or as a tuner (not illustrated) that is electrically connected with the display apparatus 100 via the input/output unit 160 or a separate electronic apparatus (e.g., a set-top box, or a one-connect; not illustrated) having a tuner (not illustrated).

The communicator 130 may connect the display apparatus 100 with a remote controller (not illustrated) or with an external apparatus (not illustrated) under control of the processor 110. The communicator 130 may transmit an electric signal (or a packet corresponding to an electric signal) to an external entity under control of the processor 110 or receive an electric signal (or a packet corresponding to an electric signal) from an external source.

The communicator 130 may download an application from an external source or perform web browsing under control of the processor 110.

The communicator 130 may include one of a wired Ethernet 131, a wireless RAN communicator 132 and a near-field communicator 133 depending on the performance and structure of the display apparatus 100. Also, the communicator 130 may include the combination of the wired Ethernet 131, the wireless RAN communicator 132 and the near-field communicator 133.

The wired Ethernet 131 may be connected with an internal network (inside a house or an office, etc.) via wired network cable under control of the processor 110. The wireless RAN communicator 132 may be connected with an AP wirelessly in the place where an access point (AP) is installed under control of the processor 110. The wireless RAN communicator 132 may include, for example, Wi-Fi.

The near-field communicator 133 may perform near-field communication with a remote controller 200 and/or an external apparatus wirelessly without an AP under control of the processor 110. The near-field communication may be, for example, Bluetooth, Bluetooth low energy, an infrared data association (IrDA), Ultra-Wideband (UWB) or a near-field communication (NFC), etc.

The microphone 140 may receive an uttered user voice. The microphone 140 may convert the received voice into an electric signal and output the converted signal to the processor 110. The user voice may be, for example, voice corresponding to a user guide, a menu or control of a function of the display apparatus 100. The recognition range of the microphone 140 may vary depending on the size of user voice and a surrounding environment (e.g., surrounding noise, etc.).

The microphone 140 may be implemented to be integrated into (as an all-in-one type) the display apparatus 100 or as a separate component. The separated microphone 140 may be electrically connected with the display apparatus 100 through the communicator 130 and the input/output unit 160.

The camera 145 may generate a video (e.g., consecutive frames) corresponding to a motion of a user within a recognition range of the camera. The user motion may be, for example, a presence of a user (e.g., a user appears within a recognition range of the camera) and a part of user's body such as a face, a facial expression, a hand, a fist, a finger, etc., or a motion of a part of user's body. The camera 145 may be configured with a lens (not illustrated) and an image sensor (not illustrated).

The camera 145 may be positioned in one of the upper end, lower end, left side and right side of the display apparatus 100.

The camera 145 may convert photographed consecutive frames and output the converted frames to the processor 110. The processor 110 may analyze the photographed consecutive frames and recognize a user's motion. The processor 110 may display a guide or a menu on the display apparatus 100 using the result of motion recognition, or perform a control operation (e.g., channel control, volume control, etc.) corresponding to the result of the motion recognition.

If there are more than two or more cameras 145, the processor 110 may receive a three-dimensional still image or a three-dimensional motion through the plurality of cameras 145.

The camera 145 may be implemented to be integrated with (as an all-in-one type) the display apparatus 100 or be implemented as a separate component. The electronic apparatus including a separate camera (not illustrated) may be electrically connected with the display apparatus 100 through the communicator 130 or the input/output unit 160.

The optical receiver 150 may receive an optical signal (including a control signal) output from a remote controller through a light window (not illustrated).

The optical receiver 150 may receive an optical signal corresponding to a user input (e.g., a touch, a press, a touch gesture, a voice or a motion) from the remote controller 200. A control signal may be extracted from the received optical signal. The received optical signal and/or the extracted control signal may be transmitted to the processor 110.

The input/output unit 260 may receive or output content (or at least one of or one part of audio or video of content) from the outside of the display apparatus 100 under control of the processor 110.

The input/output unit 160 may include one of an high-definition multimedia interface (HDMI) input port 161, a component input jack 162, a PC input port 163 and a USB input jack 164 corresponding to the receiving (or output) of content. The input/output unit 160 may also include the combination of the HDMI input port 161, the component input jack 162, the PC input port 163 and the USB input jack 164. The input/output unit 160 may be added (e.g., a display port), deleted, and/or changed depending on the performance and structure of the display apparatus 100.

The display 170 may display a video included in a broadcast signal receive through the tuner 120 under control of the processor 110. The display 170 may display content (e.g., video) input through the communicator 130 or the input/output unit 160. The display 170 may output content stored in the storage 180 under control of the processor 110. Also, the display 170 may display a voice recognition guide user interface for performing a voice recognition task or a motion recognition guide user interface for performing a motion recognition task corresponding to a motion recognition.

According to an example embodiment, a screen of the display apparatus 100 may include the display 170 of the display apparatus 100.

According to another example embodiment, the display 170 may be separated from the display apparatus 100.

The audio output unit 175 may output audio included in a broadcast signal received through the tuner 120 under control of the processor 110. The audio output unit 175 may output audio (e.g., corresponding to voice or sound) corresponding to content input through the communicator 130 or the input/output unit 160. Also, the audio output unit 175 may output an audio file stored in the storage 180 under control of the processor 110.

The audio output unit 175 may include one of a speaker 176, a headphone output terminal 177 or an S/PDIF output terminal 178 or the combination of the speaker 176, the headphone output terminal 177 or the S/PDIF output terminal 178.

The storage 180 may store various data, programs and applications for operating and controlling the display apparatus 100 under control of the processor 110. The storage 180 may store a signal or data corresponding to the operation of the tuner 120, the communicator 130, the microphone 140, the camera 145, the optical receiver 150, the input/output unit 160, the display 170, the audio output unit 175 and the power supplier 190.

The storage 180 may store a control program for controlling the display apparatus 100 and the processor 110, an application firstly provided from a manufacturing company or downloaded from an external source, a graphical user interface (GUI; hereinafter, it will be referred to as 'GUI') related to an application, an object for providing a GUI (e.g., image text, an icon, a button, etc.), user information, document, a voice database, a motion database or relevant data.

The storage 180 may include a broadcasting receiving module, a channel control module, a volume control module, a communication control module, a voice recognition module, a motion recognition module, an optical receiving module, a display control module, an audio control module, an external input control module, a power control module, a voice database (DB), or a motion database (DB), which is not illustrated in the diagram.

The modules and databases which are not illustrated in the storage in the diagram may be implemented in a form of software for performing a broadcast receiving control function, a channel control function, a volume control function, a communication control function, a voice recognition function, a motion recognition function, a light receiving control function, a display control function, an audio control function, an external input control function, or a power control function in the display apparatus 100.

The storage 180 may store a symbol or text including a video, an image, an emoticon, etc. corresponding to a visual feedback. The storage 180 may also store sound corresponding to an auditory feedback. The storage 180 may store a feedback provision time (e.g., 300 ms) of a feedback provided to a user.

In the example embodiments, the term 'storage' may include the storage 180, a storage (not illustrated) implemented as the ROM 112, the RAM 113 and an SoC (not illustrated) of the processor 110, a memory card (e.g., a micro SD card, a USB memory, etc.; not illustrated) provided in the display apparatus 100, or an external storage (e.g., a USB memory, etc.; not illustrated) connectable to a USB port 164 of the input/output unit 160. Also, the storage may include a non-volatile memory, a volatile memory, a hard disk drive (HDD), or a solid state drive (SSD).

The power supplier 190 may supply power input from an external power source to the internal elements 110 to 190 of the display apparatus 100 under control of the processor 110. The power supplier 190 may supply power input from one or two or more battery (not illustrated) provided inside the display apparatus 100 to the internal elements 110 to 190 under control of the processor 110.

At least one of the elements (e.g., the elements from 110 to 190) illustrated in the display apparatus 100 in FIGS. 1 and 4 may be added, changed, or deleted (e.g., at least one of the boxes viewed as dotted lines) depending on the performance and/or type of the display apparatus 100. Also, the positions of the elements (e.g., 110 to 190) may change depending on the performance or structure of the display apparatus 100.

Figure 5:
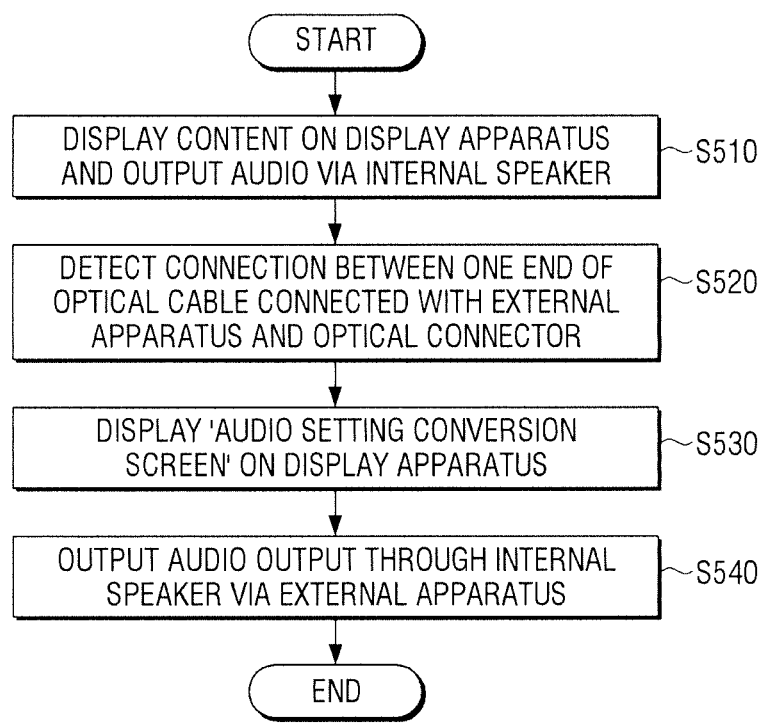
FIG. 5 is a sequence diagram illustrating a control method of a display apparatus according to an example embodiment.

FIG. 5 is a sequence diagram illustrating a control method of a display apparatus in accordance with an example embodiment.

Figure 7A:
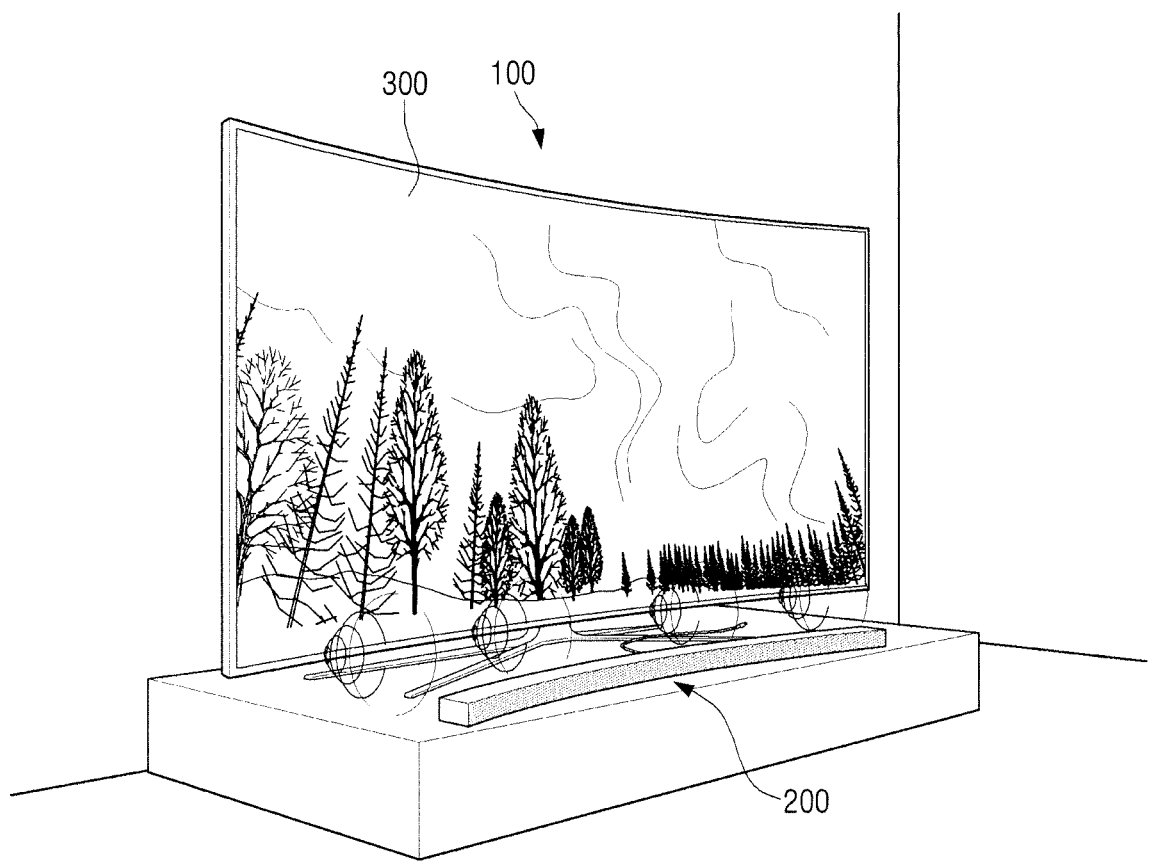
FIGS. 7A-7C are diagrams illustrating an example of a control method of a display apparatus according to an example embodiment.
Figure 7B:
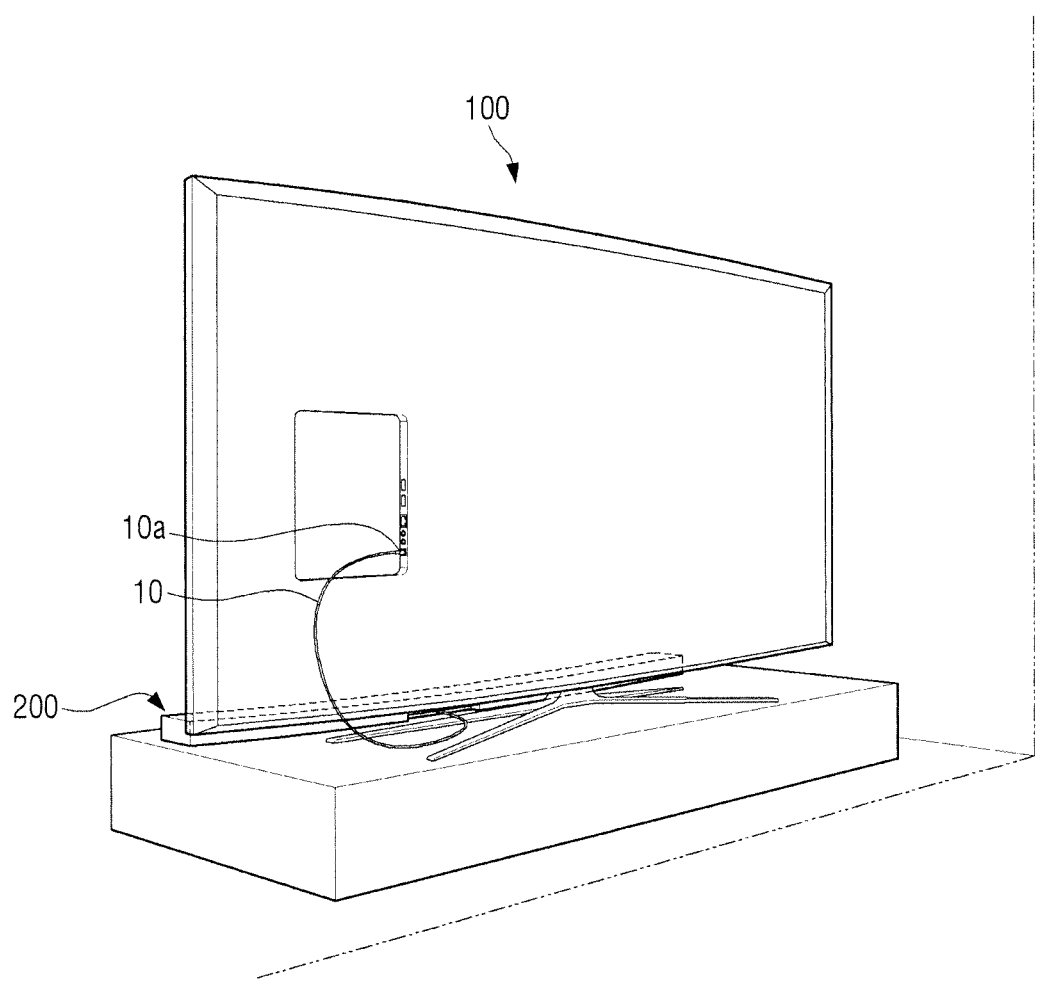
Figure 7C:
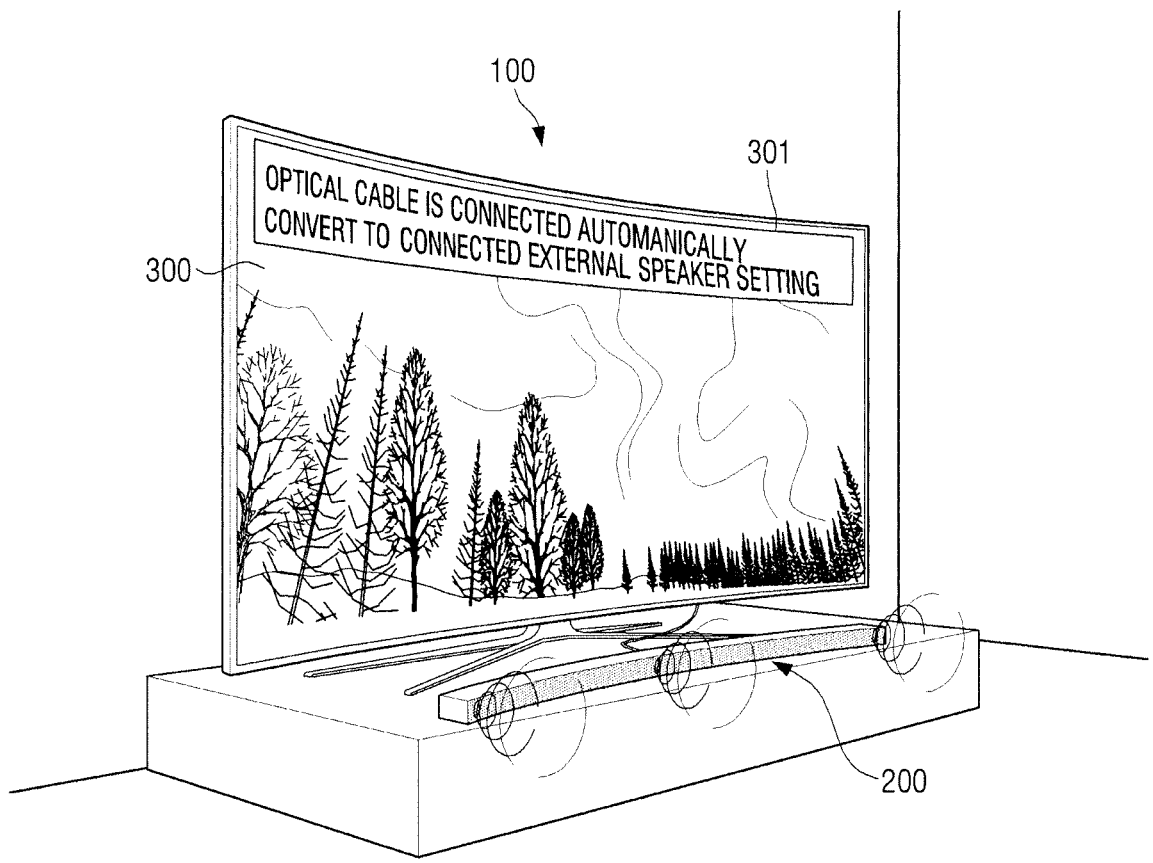

FIGS. 7A-7C are diagrams illustrating an example of a control method of a display apparatus in accordance with an example embodiment.

In operation S510 in FIG. 5, content may be displayed on the display apparatus and audio may be output through an internal speaker.

As show in FIG. 7A, content 300 may be displayed on a screen of the display apparatus 100, and sound included in (or corresponding to) the content 300 may be output from the speaker 176 of the display apparatus 100. The processor 110 may control the received (downloaded, streamed, or pre-stored) content 300 to be output through the display 170. The processor 110 may control sound corresponding to the content to be output from a speaker (or an internal speaker 176).

The other end (e.g., an optical cable plug; not illustrated) of an optical cable 10 may be connected to an audio apparatus 200 that is one of external apparatuses, and one end (e.g., the optical cable plug 10A) of an optical cable 10 may not be connected with the S/PDIF port 178 of the display apparatus 100.

In operation S520 in FIG. 5, the connection between one end of an optical cable connected with the external apparatus and the optical connector may be detected.

As shown in FIGS. 3B, 10B, 12B, 14B and 7B, a user may insert the one end 10A of the optical cable 10 into the S/PDIF port 178 (or combine the one end 10A of the optical cable 10 with the S/PDIF port 178). The processor 110 may receive an electric signal (e.g., a ground signal) generated in response to the combination of the one end 10A of the optical cable 10 and the S/PDIF port 178. The processor 110 may determine the combination of the one end 10A of the optical cable 10 and the S/PDIF port 178 in response to the received electric signal. The processor 110 may also determine the combination of the optical cable 10 and the S/PDIF port 178 according to the received electric signal.

In operation S530 in FIG. 5, an audio setting conversion screen may be displayed on the display apparatus.

As shown in FIG. 7C, the processor 110 may control a visual feedback (e.g., 'an audio setting conversion screen 301') to be displayed on the display apparatus 100 in response to the combination (or insertion) of the S/PDIF port 178 and the optical cable plug 10A. The processor 110 may control the visual feedback (e.g., 'an audio setting conversion pop-up 301') to be displayed on the display apparatus 100 in response to the combination (or insertion) of the S/PDIF port 178 and the optical cable plug 10A. According to an example embodiment, the visual feedback displayed on the display apparatus 100 may include the audio setting conversion screen 301 (or an audio setting conversion pop-up 301).

The processor 110 may control 'the audio setting conversion screen 301' to be displayed on the display apparatus 100 in response to the combination information (or insertion information) of the S/PDIF port 178 and the optical cable 10. The processor 110 may control 'the audio setting conversion pop-up 301' to be displayed on the display apparatus 100 in response to the combination information (or insertion information) of the S/PDIF port 178 and the optical cable plug 10A.

The audio setting conversion screen 301 may be overlapped with the content 300 displayed on the display apparatus 100. The audio setting conversion screen 301 may be displayed one region (e.g., one of an upper region, a lower region, a left region, a right region and a center region) of the content 300 displayed on the display apparatus 100. Also, the audio setting conversion screen 301 may be displayed during a setting time (e.g., one second; may change).

A user may perceive a change in output of audio as the audio setting conversion screen 301 is displayed (e.g., the output of audio is changed from the speaker 176 to the external apparatus 200).

According to another example embodiment, the processor 110 may control the visual effect (e.g., 'the audio setting conversion screen 301') not to be displayed on the display apparatus 100 (e.g., control the visual effect to be executed in the background) in response to the combination (or insertion) of the S/PDIF port 178 and the optical cable plug 10A.

The processor 110 may control 'the audio setting conversion screen 301' not to be displayed on the display apparatus 100 in response to the combination (or insertion) of the S/PDIF port 178 and the optical cable plug 10A. The processor 110 may control 'the audio setting conversion pop-up 301' not to be displayed on the display apparatus 100 in response to the combination (or insertion) of the S/PDIF port 178 and the optical cable plug 10A.

The processor 110 may control 'the audio setting conversion screen 301' not to be displayed on the display apparatus 100 in response to the combination information (or insertion information) of the S/PDIF port 178 and the optical cable plug 10A. The processor 110 may control 'the audio setting conversion pop-up 301' not to be displayed on the display apparatus 100 in response to the combination information (or insertion information) of the S/PDIF port 178 and the optical cable plug 10A.

In operation S540 in FIG. 5, audio output through an internal speaker may be output through an external apparatus.

As shown in FIG. 7C, the processor 110 may control audio corresponding to the content 300 to be output from an audio apparatus 200 that is one of external apparatuses in response to the combination (or insertion) of the S/PDIF port 178 and the optical cable plug 10A. The signal corresponding to the audio may be transmitted to the audio apparatus 200 via the S/PDIF port 178 and the optical cable 10. The processor 110 may control audio corresponding to the content 300 not to be output from a speaker 176 in response to the combination (or insertion) of the S/PDIF port 178 and the optical cable plug 10A. Also, the processor 110 may perform a control operation of limiting the output of the audio corresponding to the content 300 from the speaker 176 in response to the combination (or insertion) of the S/PDIF port 178 and the optical cable plug 10A.

The audio apparatus 200 may output the audio corresponding to a received signal through a speaker (not illustrated) of the audio apparatus.

According to another example embodiment, the processor 110 may control a visual feedback (e.g., 'the audio setting conversion screen 301') not to be displayed on the display apparatus 100, and may control the audio corresponding to the content 300 to be output from the audio apparatus 200 that is one of external apparatuses in response to the combination (or insertion) of the S/PDIF port 178 and the optical cable plug 10A.

In operation S540 in FIG. 5, when the audio is output from the audio apparatus 200, the control method of the display apparatus may be terminated.

Figure 6:
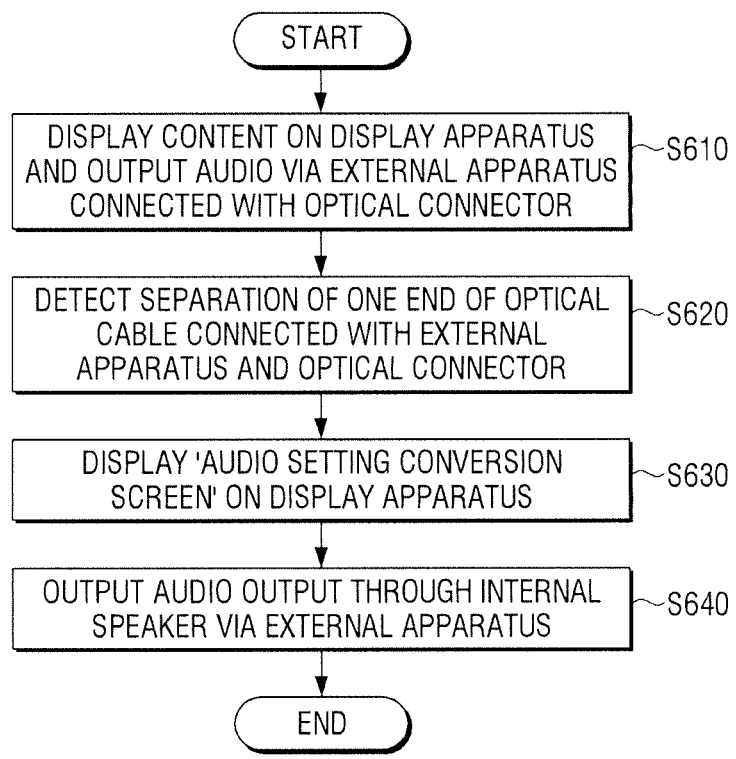
FIG. 6 is a sequence diagram illustrating a control method of a display apparatus according to another example embodiment.

FIG. 6 is a sequence diagram illustrating a control method of a display apparatus in accordance with another example embodiment.

Figure 8A:
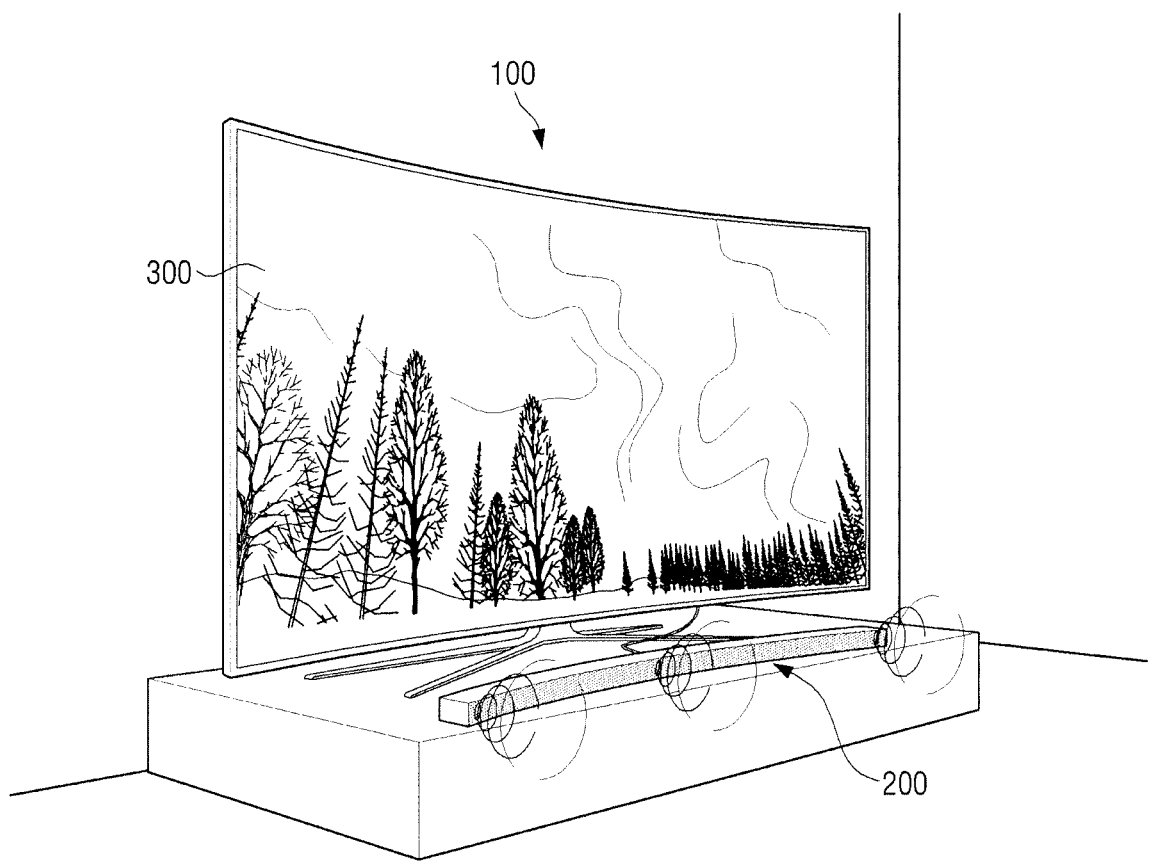
FIGS. 8A-8C are diagrams illustrating an example of a control method of a display apparatus according to another example embodiment.
Figure 8B:
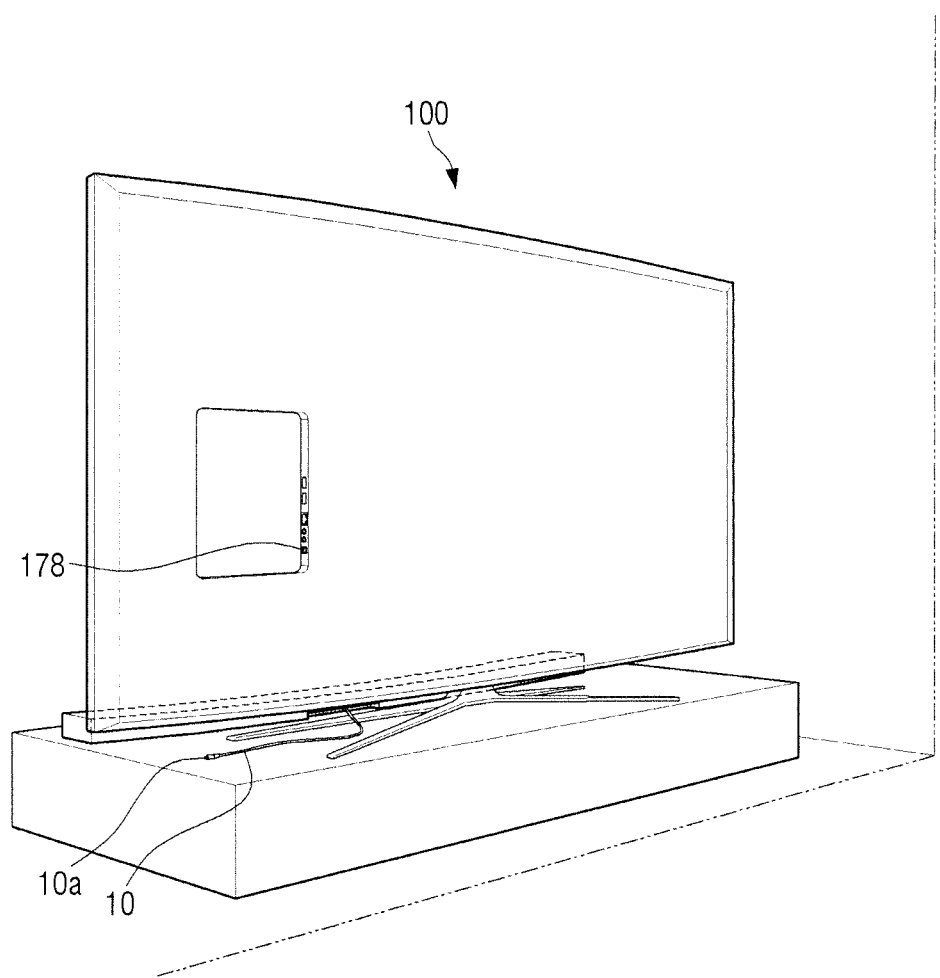
Figure 8C:
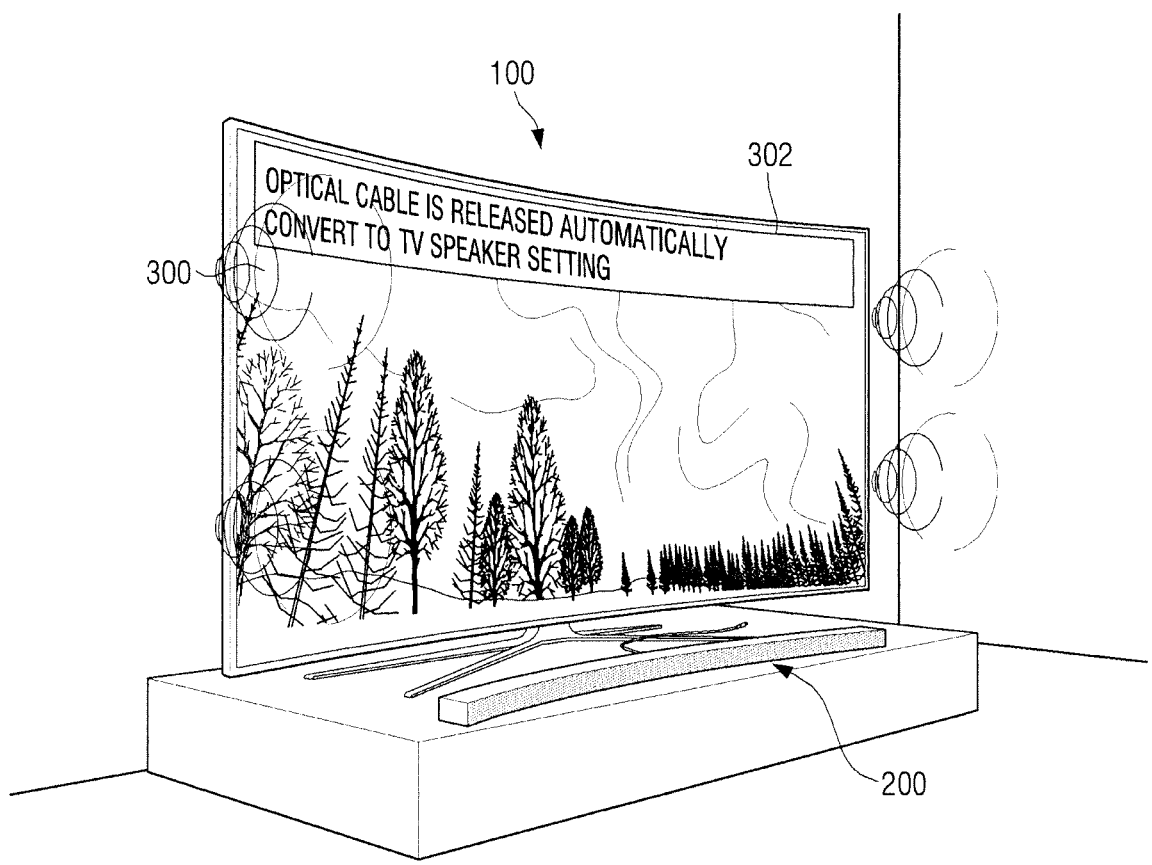

FIGS. 8A-8C are diagrams illustrating an example of a control method of a display apparatus in accordance with another example embodiment.

In operation S610 in FIG. 6, content may be displayed on the display apparatus and audio may be output through an external apparatus connected via an optical connector.

As shown in FIG. 8A, the content 300 may be displayed on a screen of the display apparatus 100. The other end (e.g., an optical cable plug; not illustrated) of the optical cable 10 may be connected with an audio apparatus 200 that is one of external apparatuses, and one end (e.g., the optical cable plug 10A) of the optical cable 10 may be connected with the S/PDIF port 178 of the display apparatus 100. The processor 110 may control audio corresponding to the content 300 to be output from the audio apparatus 200. A signal corresponding to the audio may be transmitted to the audio device 200 via the S/PDIF port 178 and the optical cable 10. Sound corresponding to (or included in) the displayed content 300 may be output via a speaker (not illustrated) of the audio apparatus 200.

The processor 110 may control the audio corresponding to the content 300 not to be output from the speaker 176 in response to the output of the audio in the audio apparatus 200.

In operation S620 in FIG. 6, the separation of one end of an optical cable connected with an external apparatus and an optical connector may be detected.

Referring to FIG. 3A, FIG. 3B, FIG. 10A, FIG. 10B, FIG. 12A, FIG. 12B, FIG. 14A, FIG. 14B, and FIG. 8B, a user may separate (or release) one end 10A of the optical cable 10 from the S/PDIF port 178. The processor 110 may not receive an electric signal (e.g., a ground signal) in response to the separation of one end 10A of the optical cable 10 and the S/PDIF port 178. As an electric signal is not received, the processor 110 may determine the separation of one end 10A of the optical cable 10 and the S/PDIF port 178. Also, as an electric signal is not received, the processor 110 may determine the separation of the optical cable 10 and the S/PDIF port 178.

In operation S630 in FIG. 6, an audio setting conversion screen may be displayed in a display apparatus.

As shown in FIG. 8C, the processor 110 may control a visual feedback (e.g., 'an audio setting conversion screen 302') to be displayed on the display apparatus 100 in response to the separation (or release) of the S/PDIF port 178 and the optical cable plug 10A. The processor 110 may control a visual feedback (e.g., 'an audio setting conversion pop-up 302') to be displayed on the display apparatus 100 in response to the separation (or release) of the S/PDIF port 178 and the optical cable plug 10A. According to the example embodiment, the visual feedback displayed on the display apparatus 100 may include the audio setting conversion screen 302 (or the audio setting conversion pop-up 302).

The processor 110 may control 'the audio setting conversion screen 302' to be displayed on the display apparatus 100 in response to the separation information (or release information) of the S/PDIF port 178 and the optical cable plug 10A. The processor 110 may control 'the audio setting conversion pop-up 302' to be displayed on the display apparatus 100 in response to the separation information (or release information) of the S/PDIF port 178 and the optical cable plug 10A.

The audio setting conversion screen 302 may be overlapped with the content 300 displayed on the display apparatus 100 and be displayed. The audio setting conversion screen 302 may be displayed in one region (e.g., at least one of the upper region, the lower region, the left region, the right region and the center region) of the content 300 displayed on the display apparatus 100. Also, the audio setting conversion screen 302 may be displayed during a setting time (e.g., for one second; may change).

A user may perceive the change in output of audio (e.g., changing of output of audio from the external apparatus 200 to a speaker 176) as the audio setting conversion screen 302 is displayed.

According to another example embodiment, the processor 110 may control a visual feedback (e.g., 'the audio setting conversion screen 302') not to be displayed on the display apparatus 100 (e.g., control a visual feedback to be executed in the background) in response to the separation (or release) of the S/PDIF port 178 and the optical cable plug 10A. The processor 110 may control 'the audio setting conversion screen 302' not to be displayed on the display apparatus 100 in response to the separation (or release) of the S/PDIF port 178 and the optical cable plug 10A. The controller 100 may also control 'the audio setting conversion pop-up 302' not to be displayed on the display apparatus 100 in response to the separation (or release) of the S/PDIF port 178 and the optical cable plug 10A.

The processor 110 may control 'the audio setting conversion screen 302' not to be displayed on the display apparatus 100 in response to the separation information (or release information) of the S/PDIF port 178 and the optical cable plug 10A. The processor 110 may control 'the audio setting conversion pop-up 302' not to be displayed on the display apparatus 100 in response to the separation information (or release information) of the S/PDIF port 178 and the optical cable plug 10A.

In operation S640 in FIG. 6, audio output via an external apparatus may be output via an internal speaker.

As shown in FIG. 8C, the processor 110 may control the audio corresponding to the content 300 to be output from the speaker 176 in response to the separation (or release) of the S/PDIF port 178 and the optical cable plug 10A. The signal corresponding to the audio may not be transmitted to the audio apparatus 200 via the S/PDIF port 178 and the optical cable 10.

According to another example embodiment, the processor 110 may control a visual feedback (e.g., 'the audio setting conversion screen 302') not to be displayed on the display apparatus 100 but control the audio corresponding to the content 300 to be output from the speaker 176 in response to the separation (or release) of the S/PDIF port 178 and the optical cable plug 10A.

In operation S640 in FIG. 6, when the audio is output from the speaker 176, the control method of the display apparatus may be terminated.

The methods described in the example embodiments may be implemented in a form of a program instruction executable by various computer means and be recorded in a computer readable medium. The computer readable medium may include a program instruction, a data file, a data structure, etc. or the combination thereof. For example, the computer readable medium may be stored in a volatile or non-volatile storage device such as a ROM, etc., or a RAM, a memory chip, a memory such as a device or a direct circuit, etc., or a storage medium capable of recording data optically or magnetically and is readable by a machine (e.g., a compute) such as a CD, a DVD, a magnetic disk, a magnetic tape, etc. irrespective of whether data can be deleted or re-recorded.

Also, the computer readable program may be stored in a computer readable storage medium, and the computer program may be downloaded in a computing device via network.

It will be understood that a memory which can be included in the display apparatus is one example of a storage medium that is appropriate to store a program or programs including the instructions for implementing the example embodiments and is readable by a machine. The program instructions recorded in the medium may be specially designed or configured, or may be informed to a person having skill in the art and be used.

The foregoing example embodiments and advantages are merely examples and are not to be construed as limiting the example embodiments. The description of the example embodiments is intended to be illustrative, and not to limit the scope of the inventive concept, as defined by the appended claims, and many alternatives, modifications, and variations will be apparent to those skilled in the art.

Therefore, the scope of the present invention is not construed as being limited to the described exemplary embodiments, but is defined by the appended claims as well as equivalents thereto.

What is claimed is:

1. A display apparatus comprising:
   a speaker;
   an optical connector configured to be connectable with an optical cable via insertion of the optical cable into the optical connector, to connect the display apparatus to an external apparatus, the optical connector including
      a contact point, and
      a protruded pin being moved to contact the contact point based on the optical cable being inserted into the optical connector, thereby generating an electric signal, and being separated by elasticity from the contact point based on the optical cable being not inserted into the optical connector; and
   a processor configured to:
      identify whether the optical connector is connected with or separated from the optical cable based on whether the electric signal is generated, and
      control audio output to be output from the speaker or from the external apparatus via the optical cable, based on whether the optical connector and the optical cable are identified as connected or separated.

2. The display apparatus as claimed in claim 1, further comprising:
   a display,
   wherein the processor is further configured to,
      when the processor identifies that the optical connector and the optical cable are separated, control the display to display information indicating that the audio output is to be output from the speaker, and
      when the processor identifies that the optical connector and the optical cable are connected, control the display to display information indicating that the audio output is to be output from the external apparatus.

3. The display apparatus as claimed in claim 2, wherein the information indicating that the audio output is to be output from the speaker is displayed in at least one of an upper region, a lower region, a left region and a center region of an area of the display in which a content is displayed, and
   the information indicating that the audio output is to be output from the external device is displayed in at least one of the upper region, the lower region, the left region and the center region of the area of the display in which the content is displayed.

4. The display apparatus as claimed in claim 1, wherein the processor is further configured to, while the audio output is output from the external apparatus, perform a control operation of limiting the output of the audio from the speaker.

5. The display apparatus as claimed in claim 1, wherein the optical connector comprises:
   a main body;
   a shutter configured to rotate with respect to the main body according to contact between the shutter and the optical cable based on the optical cable being inserted into the optical connector; and
   an optical element configured to output a signal corresponding to the audio output via the optical cable.

6. The display apparatus as claimed in claim 1, wherein the processor is further configured to
   determine whether or not the electric signal is received by the processor, and
   the processor identifies whether the optical connector is connected with or separated from the optical cable in accordance with the determination by the processor whether or not the electric signal is received by the processor.

7. The display apparatus as claimed in claim 1, wherein the optical connector comprises:
   a main body, and
   a shutter configured to, based on the optical cable being inserted into the optical connector, rotate with respect to the main body from an initial position, and
   an elastic member configured to return the shutter to the initial position based on the optical connector being separated from the optical cable.

8. The display apparatus as claimed in claim 5, wherein
the shutter is configured to rotate with respect to the main body from an initial position according to the contact between the shutter and the optical cable, and
the connector further comprises an elastic member configured to return the shutter to the initial position based on the optical connector being separated from the optical cable.

9. A display apparatus comprising:
a display;
a speaker;
an optical connector configured to be connectable with an optical cable, to connect the display apparatus to an external apparatus via the optical cable, the optical connector including
a contact point, and
a protruded pin being moved to contact the contact point based on the optical cable being connected to the optical connector, thereby generating an electric signal, and being separated by elasticity from the contact point based on the optical cable being not connected to the optical connector; and a processor configured to,
with the optical connector not connected to the optical cable,
perform control so that an audio output is output from the speaker while content is being displayed on the display,
with the audio output being output from the speaker while the content is being displayed on the display, determine whether or not the optical connector is connected with the optical cable,
in response to the processor determining that the optical connector is connected with the optical cable,
control the display to display information indicating that the audio output is to be output from the external apparatus,
perform control to stop the audio output from being output from the speaker, and
perform control to cause the audio output to be output from the external apparatus.

\* \* \* \* \*